(12) United States Patent
Sumihara et al.

(10) Patent No.: US 7,838,153 B2
(45) Date of Patent: Nov. 23, 2010

(54) CURRENT COLLECTOR, ELECTRODE, AND NON-AQUEOUS ELECTROLYTE SECONDARY BATTERY

(75) Inventors: Masanori Sumihara, Osaka (JP); Shuji Ito, Nara (JP); Yasutaka Kogetsu, Osaka (JP); Katsumi Kashiwagi, Nara (JP); Nobuyuki Kirihara, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/439,296

(22) PCT Filed: Aug. 28, 2007

(86) PCT No.: PCT/JP2007/066675
§ 371 (c)(1),
(2), (4) Date: Feb. 27, 2009

(87) PCT Pub. No.: WO2008/026595
PCT Pub. Date: Mar. 6, 2008

(65) Prior Publication Data
US 2009/0202908 A1 Aug. 13, 2009

(30) Foreign Application Priority Data
Aug. 29, 2006 (JP) .............................. 2006-231740
Apr. 6, 2007 (JP) .............................. 2007-100335

(51) Int. Cl.
*H01M 4/58* (2010.01)
(52) U.S. Cl. .................................. 429/233; 429/218.1
(58) Field of Classification Search ............. 429/245, 429/233, 243, 218.1, 234, 242, 209, 235; 29/2
See application file for complete search history.

(56) References Cited

U.S. PATENT DOCUMENTS

| | | | |
|---|---|---|---|
| 6,833,218 B2 * | 12/2004 | Mann | ...................... 429/245 |
| 2004/0161670 A1 | 8/2004 | Kawase et al. | |
| 2004/0166409 A1 | 8/2004 | Takada et al. | |

FOREIGN PATENT DOCUMENTS

| | | |
|---|---|---|
| CN | 1519964 A | 8/2004 |
| CN | 1523690 A | 8/2004 |
| JP | 56-120074 | 9/1981 |
| JP | 4-188568 | 7/1992 |

(Continued)

OTHER PUBLICATIONS

Chinese Office Action issued in Chinese Patent Application No. CN 200780032330.7 dated Jul. 30, 2010.

*Primary Examiner*—Jennifer Michener
*Assistant Examiner*—Monique Wills
(74) *Attorney, Agent, or Firm*—McDermott Will & Emery LLP

(57) ABSTRACT

An electrode capable of effectively dispersing or relieving the stress generated in association with expansion and contraction of an active material is provided. The electrode is produced by forming an active material layer on a predetermined current collector. This current collector includes a base and a plurality of projections formed so as to extend outwardly from a surface of the base. The cross section of the projections in a thickness direction of the current collector has a tapered shape in which a width in a direction parallel to the surface of the base narrows from the surface of the base along an extending direction of the projections.

6 Claims, 18 Drawing Sheets

FOREIGN PATENT DOCUMENTS

| | | |
|---|---|---|
| JP | 2001-283834 | 10/2001 |
| JP | 2002-079466 | 3/2002 |
| JP | 2002-083594 | 3/2002 |
| JP | 2002-270186 | 9/2002 |
| JP | 2002-279972 | 9/2002 |
| JP | 2003-007305 | 1/2003 |
| JP | 2003-258182 | 9/2003 |
| JP | 2004-127561 | 4/2004 |
| JP | 2005-032642 | 2/2005 |
| JP | 2005-196970 | 7/2005 |
| JP | 2007-052960 | 3/2007 |

* cited by examiner (a)

(b)

(c)

(a)

(b)

(c)

(d)

(e)

US 7,838,153 B2

CURRENT COLLECTOR, ELECTRODE, AND NON-AQUEOUS ELECTROLYTE SECONDARY BATTERY

RELATED APPLICATIONS

This application is the U.S. National Phase under 35 U.S.C. §371 of International Application No. PCT/JP2007/066675, filed on Aug. 28, 2007, which in turn claims the benefit of Japanese Application Nos. 2006-231740, filed on Aug. 29, 2006 and 2007-100335, filed on Apr. 6, 2007, the disclosures of which Applications are incorporated by reference herein.

TECHNICAL FIELD

The present invention relates to current collectors, electrodes, and non-aqueous electrolyte secondary batteries.

BACKGROUND ART

In recent years, as electronic devices and telecommunication devices have become smaller in size and lighter in weight, the demand for secondary batteries to be used as a power supply for such devices has been increased. Among various secondary batteries, lithium secondary batteries, because of their high capacity, high energy density, and excellent charge/discharge cycle characteristics, have a significantly large market share. Typical lithium secondary batteries are mainly constituted of a negative electrode including a carbon material capable of absorbing and desorbing lithium, and a positive electrode including a composite oxide of a transition metal and lithium, such as $LiCoO_2$. However, in response to the current trend toward more multi-functional electronic devices and telecommunication devices, with respect to such lithium secondary batteries also, there have been demand for achieving a higher energy density and further improving charge/discharge cycle characteristics.

Under these circumstances, alloy-based active materials that absorb lithium by forming an alloy with lithium have been attracting attention as materials to satisfy such demand. Examples of known alloy-based active materials include silicon, tin, and germanium; and an alloy, an oxide, and a nitride containing these. Such alloy-based active materials have a high capacity. For example, the theoretical discharge capacity of silicon is about 4199 mAh/g, which is about eleven times as large as that of graphite (e.g., see Patent Document 1). However, there is a problem to be solved in such alloy-based active materials, that is, the structure thereof significantly changes during charging when lithium ions are absorbed therein. In an active material layer containing an alloy-based active material (hereinafter referred to as an "alloy-based active material layer"), the stress generated in association with expansion of the alloy-based active material could easily cause disadvantages such as cracks of alloy-based active material particles, separation of the alloy-based active material layer from a current collector, deformation of the current collector followed by deformation of the electrode, and others. These disadvantages will then be the cause of the reduction in the electron conductivity between the alloy-based active material layer and the current collector, and the deterioration in the charge/discharge cycle characteristics of the battery.

In view of the problem in alloy-based active materials, for example, an electrode including a specific current collector and a thin film of alloy-based active material layer has been proposed (e.g., see Patent Document 2). In this proposal, the current collector is made of a copper alloy and has a tensile strength of 400 $N/mm^2$ or more, a proportional limit of 160 $N/mm^2$ or more, an elastic modulus of 1.1 $N/mm^2$ or more, and a surface roughness Ra of the surface on which the alloy-based active material layer is formed of 0.01 to 1 μm. Further, for the purpose of adjusting the surface roughness Ra of the surface of the current collector within the foregoing predetermined range, forming projecting matters made of copper on the surface of the current collector by electrolysis plating is disclosed in Patent Document 2. Further, forming a thin film of alloy-based active material layer on the surface of the current collector by vacuum vapor deposition, plating, and the like is disclosed. The technique disclosed in Patent Document 2 is effective to some extent in terms of successfully increasing the bonding strength between the alloy-based active material layer and the current collector and preventing the separation of the alloy-based active material layer from the current collector. However, merely increasing the bonding strength between the alloy-based active material layer and the current collector cannot sufficiently absorb the expansion stress of the alloy-based active material, and thus the deformation such as wrinkling and cracking inevitably occurs in the electrode.

In order to relieve the expansion stress of the alloy-based active material, techniques of providing gaps in the interior of the alloy-based active material layer have been proposed (see, for example, Patent Documents 3 and 4). Patent Document 3 discloses an electrode comprising a current collector with projections and depressions formed on a surface thereof, and a thin film of alloy-based active material layer formed on the surface of the current collector with projection and depressions provided thereon. When this electrode is incorporated in a battery and the battery is charged for the first time, due to the expansion stress of the alloy-based active material, gaps are formed in the thin film of alloy-based active material layer along the projections and depressions on the surface of the current collector. The technique disclosed in Patent Document 3 intends to allow the expansion stress of the alloy-based active material to be absorbed by the gaps. Disadvantageously, however, since the gaps are formed by charging in Patent Document 3, it is difficult to obtain evenly-distributed gaps in the thin film of alloy-based active material layer. As such, in this thin film of alloy-based active material layer, there are a portion where the expansion stress can be relieved because of the presence of gaps and a portion where the expansion stress cannot be relieved because of the absence of gaps. As a result, sufficient stress-relieving effect cannot be obtained, and thus the electrode may be deformed.

Patent Document 4 discloses an electrode comprising a current collector with a predetermined projection/depression pattern formed on a surface thereof, and an alloy-based active material layer composed of a plurality of columns containing an alloy-based active material. The projection/depression pattern is formed by photolithography. The columns are formed so as to extend from the surfaces of the projections or depressions in the projection/depression pattern of the current collector, in directions normal to the surfaces. Forming columns only on the surfaces of the projections or depressions in the predetermined projection/depression pattern brings about both an advantage and a disadvantage in the technique disclosed in Patent Document 4. The advantage is the presence of gaps between columns adjacent to each other. By virtue of these gaps, the expansion stress in the columns toward the sides thereof is relieved. The disadvantage is that the expansion stress in the columns toward the current collector is concentrated at the interfaces between the columns and the projections or depressions, causing the columns to be easily separated from the surfaces of the projections or depressions. Accordingly, with the technique disclosed in Patent Document 4, the deformation of the electrode is prevented to some extent, but it is difficult to completely prevent the separation of the columns, namely, the alloy-based active material layer.

Moreover, an electrode including a current collector and a thin film of alloy-based active material layer, in which the value of (Surface roughness Ra of thin film of alloy-based active material layer)−(Surface roughness Ra of current collector) is 0.1 μm or more has been proposed (see, for example, Patent Document 5). Conventionally, a thin film is formed on a surface of the current collector by vacuum vapor deposition and the like, which provides a thin film having a surface roughness approximately equal to that of the current collector. In Patent Document 5, a thin film formed by the conventional method is subjected to a treatment, such as sand-blasting and surface-grinding, so that the surface roughness of the thin film is adjusted to the foregoing specific value. By doing this, it is intended to relieve the stress due to expansion of the alloy-based active material. The technique disclosed in Patent Document 5 is effective to some extent in that cracks on the alloy-based active material can be prevented, but has no significant difference from those disclosed in Patent Documents 2 and 3 in that a thin film is formed over the entire surface of the current collector. As such, the separation of the thin film from the current collector, the deformation of the electrode, and the like will easily occur.

In addition, with regard to the technique of roughening the surface of a current collector in order to enhance the bonding strength between the current collector and the active material layer, various proposals have been suggested in patent documents other than the above patent documents. For example, there has been proposed a method of allowing fine particles to be ejected from a nozzle and collide with the surface of a rolled copper foil at high speeds, thereby forming minor projections and depressions on the surface (see, for example, Patent Document 6). According to this method, it is difficult to uniformly form projections and depressions on the surface of a current collector in its longitudinal and lateral directions since there is a variation in the velocity of the fine particles ejected from the nozzle.

Furthermore, there has been proposed a metallic foil surface roughening method of forming projections and depressions by irradiating a metallic foil with laser beams so that the metallic foil has a surface roughness of 0.5 to 10 μm as a 10-point average roughness (see, for example, Patent Document 7). According to the technique disclosed in Patent Document 7, depressions are formed by irradiating a metallic foil with laser beams to locally heat the metallic foil and vaporize metal in the heated portion. The metallic foil, however, will be subjected to heat higher than the melting point of the metal constituting the metallic foil by laser irradiation. Moreover, since the laser beams are linearly applied, the irradiated portions and non-irradiated portions will coexist in the metallic foil. Because of this, it is difficult to prevent the occurrence of crinkling, wrinkling, warping, and the like on the metallic foil. In addition, in the case where a metallic foil having a thickness of 20 μm or less, such as a current collector for a lithium secondary battery, is subjected to laser irradiation, disadvantageously, the metallic foil may be perforated because of the variation in the output power of the laser.

Further, in order to improve the bonding strength and the electric conductivity between the active material layer and the current collector, there has been proposed a current collector having specific projections and depressions (see, for example, Patent Document 8). FIGS. 21(a) to (e) are perspective views schematically showing a configuration of the current collector of Patent Document 8. On the current collector of Patent Document 8, projections and depressions are regularly formed in such a manner that while a local portion on one surface of the metallic foil is depressed, a portion corresponding to the local portion on the other surface of the metallic foil projects outwardly from the other surface. The current collector having such projections and depression, during the production thereof, will unavoidably have deformations such as crinkling, wrinkling, and warping.

Still further, there has been proposed an electrode including: a current collector made of a punching metal having a porosity of 20% or less and having projections and depressions formed by embossing; and a layer made of an active material filling the depressions of the current collector, in which the projections of the current collector are exposed or the active material adheres to the projections (see, for example, Patent Document 9). FIGS. 22(a) to (c) are longitudinal cross-sectional views schematically showing a configuration of electrodes 101 to 103 of Patent Document 9. The electrode 101 shown in FIG. 22(a) includes a current collector 110 with projections and depressions formed thereon and a layer 111 of active material filling depressions 110b of the current collector 110. The active material layer 111 adheres to the surfaces of projections 110a of the current collector 110. In the electrodes 102 and 103 shown in FIGS. 22(b) and (c), projections 120a and 130a of current collectors 120 and 130 are both exposed. According to Patent Document 9, the projections and depressions are formed by embossing the punching metal having a porosity of 20% or less, the obtained current collector fails to have a sufficient mechanical strength. This may disadvantageously result in tearing of the electrode, and the like.

Patent Document 1: Japanese Laid-Open Patent Publication No. 2002-83594

Patent Document 2: Japanese Laid-Open Patent Publication No. 2003-7305

Patent Document 3: Japanese Laid-Open Patent Publication No. 2001-283834

Patent Document 4: Japanese Laid-Open Patent Publication No. 2004-127561

Patent Document 5: Japanese Laid-Open Patent Publication No. 2002-279972

Patent Document 6: Japanese Laid-Open Patent Publication No. 2002-79466

Patent Document 7: Japanese Laid-Open Patent Publication No. 2003-258182

Patent Document 8: Japanese Laid-Open Patent Publication No. 2002-270186

Patent Document 9: Japanese Laid-Open Patent Publication No. 2005-32642

DISCLOSURE OF THE INVENTION

Problem To be Solved by the Invention

An object of the present invention is to provide a current collector effective in, in an electrode including a current collector and an alloy-based active material layer formed on the surface of the current collector, preventing cracks of alloy-based active material particles, separation of the alloy-based active material layer from the current collector, and deformation of the current collector followed by deformation of the electrode, and the like.

Another object of the present invention is to provide an electrode including the current collector of the present invention and an alloy-based active material layer, the electrode being effective in achieving a higher energy density and further improving the charge/discharge cycle characteristics of a battery and being capable of maintaining an initial performance at a high level even after a long-term use.

Still another object of the present invention is to provide a non-aqueous electrolyte secondary battery including the electrode of the present invention and having a high energy density and excellent charge/discharge cycle characteristics.

Means for Solving the Problem

The present invention relates to a current collector including a base and a plurality of projections formed so as to extend outwardly from a surface of the base, wherein a cross section of the projections in a thickness direction of the current collector has a tapered shape in which a width in a direction parallel to the surface of the base narrows from the surface of the base along an extending direction of the projections.

Preferably, the projections have a height L, and a diameter $D_{0.3}$ of the projections at a height of 0.3 L is larger than a diameter $D_{0.8}$ of the projections at a height of 0.8 L.

Preferably, the ratio $(D_{0.5}/D_{0.3})$ of a diameter $D_{0.5}$ of the projections at a height of 0.5 L to the diameter $D_{0.3}$ of the projections at a height of 0.3 L is 0.98 or less.

Preferably, the ratio $(D_{0.8}/D_{0.5})$ of the diameter $D_{0.8}$ of the projections at a height of 0.8 L to the diameter $D_{0.5}$ of the projections at a height of 0.5 L is 0.4 or more.

Preferably, in a cross section of the current collector in its thickness direction, at least one of angles θ formed between a line representing a side surface of the projections and a line representing the surface of the base is more than 90° and less than 160°.

Preferably, there is no boundary between the base and the projections, and there is at least a crystalline portion continuously present from the base to the projections, the crystalline portion having an almost homogeneous crystalline state.

Preferably, the projections are formed without undergoing compression.

Preferably, tip ends of the projections in the extending direction of the projections have a flat surface.

The present invention further relates to an electrode including the current collector of the present invention and an active material layer.

Preferably, the active material layer includes columnar particles containing an active material, the columnar particles being formed so as to extend outwardly from surfaces of the projections of the current collector.

Preferably, the columnar particles are inclined with respect to a direction normal to a surface of the current collector.

Preferably, each of the columnar particles is a stack of a plurality of columnar bodies containing the active material.

Preferably, the active material is at least one alloy-based negative electrode active material selected from the group consisting of silicon, tin, germanium, and aluminum, and/or a compound containing the at least one alloy-based negative electrode active material.

Preferably, the compound containing the at least one alloy-based negative electrode active material is at least one selected from the group consisting of an alloy, an oxide, and a sulfide containing the at least one alloy-based negative electrode active material.

The present invention furthermore relates to a non-aqueous electrolyte secondary battery including the electrode of the present invention, a counter electrode thereof, and a non-aqueous electrolyte with lithium ion conductivity.

Effect of the Invention

The current collector of the present invention has a structure effective in relieving or dispersing stress generated in association with expansion and contraction of an alloy-based active material. As such, in the electrode of the present invention including the current collector of the present invention and an alloy-based active material layer, cracks of alloy-based active material particles, separation of the alloy-based active material layer from the current collector, and deformation of the current collector followed by deformation of the electrode, and the like hardly occur. This effect is primarily attributable to the structure of the current collector and, for this reason, is unlikely to be reduced even after a long-term use.

In addition, a non-aqueous electrolyte secondary battery including the electrode of the present invention has a high energy density, is excellent in charge/discharge cycle characteristics, and exhibits little degradation in performance even after a long-term use, and, therefore, is extremely useful as a power supply for various multi-functional portable electronic devices.

BRIEF DESCRIPTION OF THE DRAWINGS

FIG. 4(a) is a perspective view showing an appearance of the roller. FIG. 4(b) is an enlarged perspective view showing a surface region of the roller shown in FIG. 4(a).

BEST MODE FOR CARRYING OUT THE INVENTION

Current Collector

Figure 1:
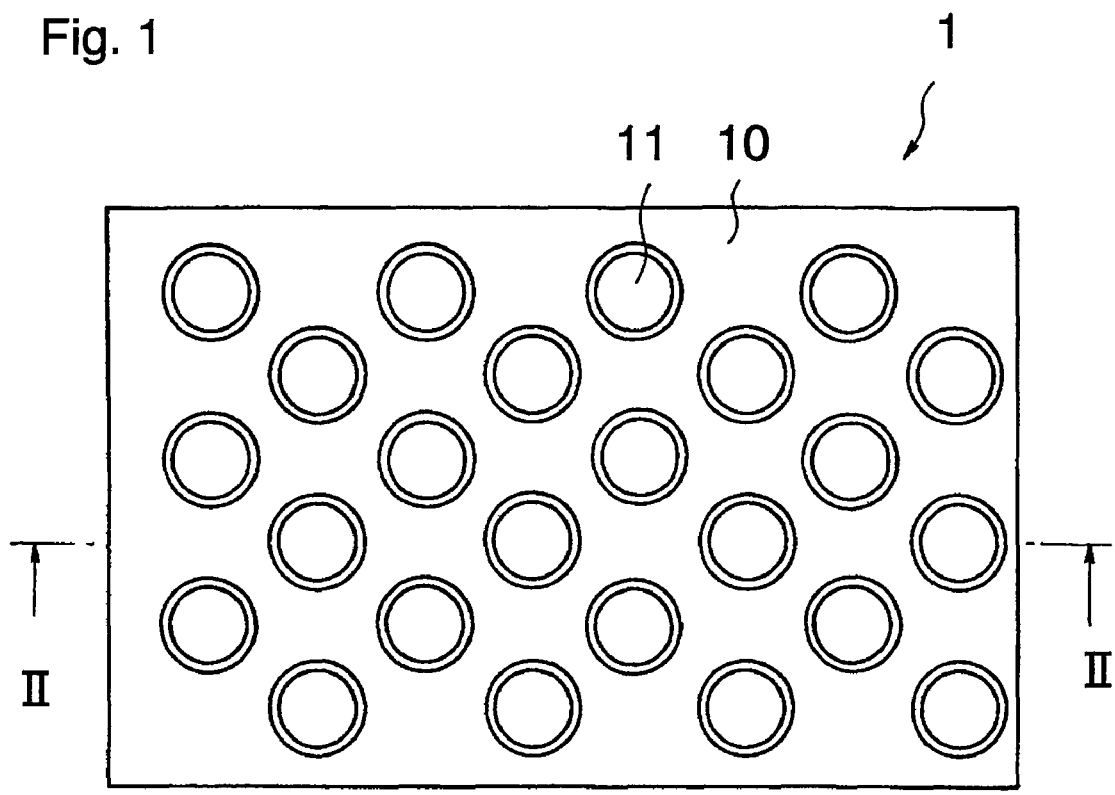
FIG. 1 is a top view schematically showing a configuration of a current collector as one embodiment of the present invention.
Figure 2:
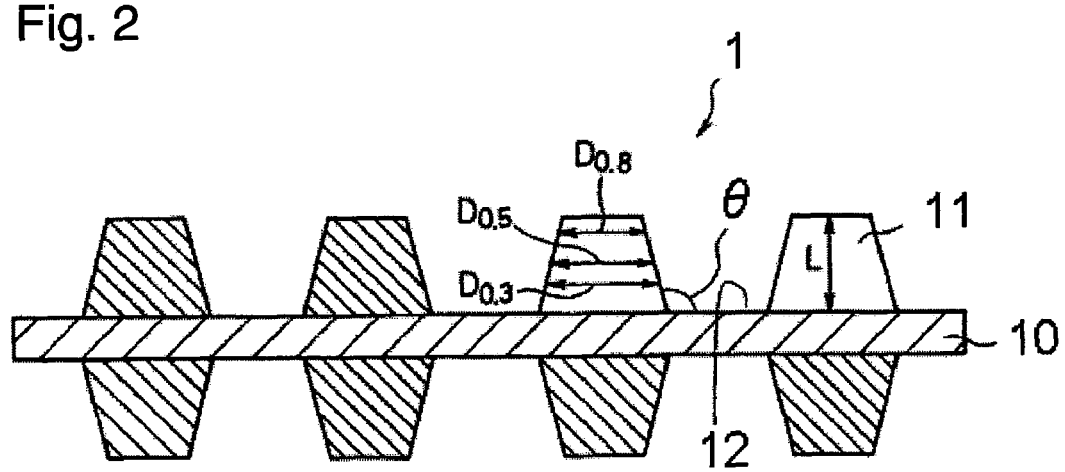
FIG. 2 is a cross-sectional view taken along cross-sectional line II-II of the current collector shown in FIG. 1.

FIG. 1 is a top view schematically showing a configuration of a current collector 1 as one embodiment of the present invention. FIG. 2 is a cross-sectional view taken along cross-sectional line II-II of the current collector 1 shown in FIG. 1.

The current collector 1 includes a base 10 and projections 11.

The base 10 is formed into a sheet or a film, and the cross section in the thickness direction thereof is approximately rectangle. The thickness direction of the base 10 coincides with the thickness direction of the current collector 1. The thickness direction of the current collector 1 coincides with the direction normal to the surface of the current collector 1.

In the case of using the current collector 1 as a negative electrode current collector, the base 10 is made of a material that does not electrochemically react with lithium. Examples of such a material include copper, nickel, iron, an alloy containing at least one of these, and the like. Among these, copper and a copper alloy are preferred because of their ease in handling and low costs. Examples of the copper alloy include a precipitation hardening alloy, such as a zinc-containing copper, a tin-containing copper, a silver-containing copper, a zirconium-containing copper, chromium copper, tellurium copper, titanium copper, beryllium copper, iron-containing copper, phosphorus-containing copper, and aluminum copper; a composite alloy of two or more of these alloys; and the like. The content of different metals other than copper in the copper alloy is not particularly limited but preferably is 0.01% by weight to 10% by weight of the total weight of the copper alloy.

In the case of using the current collector 1 as a positive electrode current collector, the base 10 is made of a material that does not dissolve in the positive electrode potential region and does not electrochemically react with lithium. Examples of such a material include aluminum, an aluminum alloy, stainless steel, titanium, and the like.

The base 10 can be made, for example, with the use of a material that does not electrochemically react with lithium according to a common production method of a metallic foil, a metallic film, a non-woven fabric, or the like. Examples of a metallic foil of copper or a copper alloy to be used as a negative electrode current collector include an electrolytic copper foil, an electrolytic copper alloy foil, a rolled copper foil, a copper alloy foil, a rolled copper alloy foil, foils obtained by roughening the surface of these foils, and the like. Preferred foils for surface-roughening include an electrolytic copper foil, a rolled copper foil, a copper alloy foil, and the like. As a positive electrode current collector, for example, a metallic foil made of aluminum, an aluminum alloy, stainless steel, titanium, or the like, a non-woven fabric, may be used. The surface of the metallic foil used as a positive electrode current collector also may be roughened. Such metallic foil, metallic film, non-woven fabric as described above can be used as a raw material sheet for current collector in the below-described production method of the current collector 1.

The thickness of the base 10 is not particularly limited but is preferably 5 µm to 100 µm and more preferably 8 µm to 35 µm. When the thickness of the base 10 is less than 5 µm, the mechanical strength of the current collector 1 may become insufficient. This will consequently reduce the ease of handling of the current collector 1 during production of an electrode and easily cause the rupture of the electrode during charging of a battery, and the like. When the thickness of the base 10 exceeds 100 µm, although the mechanical strength of the current collector 1 is ensured, the ratio of the volume of the current collector 1 to that of the electrode is increased, and consequently the capacity of the battery may not be improved sufficiently.

The projections 11 have a function of, for example, carrying an active material layer on at least part of their surfaces. The projections 11 are two or more in number and are formed on one or both surfaces of the base 10 in its thickness direction. The projections 11 are formed so as to extend outwardly from the surface of the base 10.

In other words, the projections 11 are formed so as to continue to the base 10. It is further preferable to configure such that there is no boundary between the base 10 and the projections 11, and there is at least one crystalline portion continuously present from the base 10 to the projections 11, the crystalline portion having an almost homogeneous crystalline state. This further improves the bonding strength between the base 10 and the projections 11 and more surely prevents the separation of the projections 11 from the base 10.

Two adjacent projections 11 are formed so as to be spaced apart from each other on the surface of the base 10. Accordingly, in the cross section of the current collector 1 in its thickness direction shown in FIG. 2, a depressed surface 12 exists between two adjacent projections 11.

The projections 11 are formed of the same material as that constituting the base 10.

The cross section of the projections 11 in the thickness direction of the current collector 1 (hereinafter simply referred to as the "cross section of the projections 11") has a tapered shape. Specifically, the cross section of the projections 11 has a tapered shape in which the width in a direction parallel to the surface of the base 10 (hereinafter simply referred to as the "cross-sectional width of the projections 11") gradually or continuously narrows from the surface of the base 10 along an extending direction of the projections 11. In this embodiment, the cross section of the projections 11 is approximately trapezoidal. Further, in this embodiment, the shape of the projection 11 is a truncated cone. However, the shape of the projection 11 is not particularly limited, as long as the cross section of the projection 11 has a tapered shape. Furthermore, in this embodiment, the extreme ends of the projections 11 in the extending direction of the projections 11 is formed of a flat surface approximately parallel to the surface of the base 10 but not limited thereto. For example, the extreme ends may be formed of a flat surface not parallel to the surface of the base 10, a polygonal dome or a spherical dome with roughened surface, and the like. As long as the extreme tip end has the above-listed shapes, the bonding strength between the base and the active material layer can be effectively enhanced.

When the projections 11 have a height L in a cross section of the projections 11, it is preferable that a diameter $D_{0.3}$ of the projections 11 at a height of 0.3 L is larger than a diameter $D_{0.8}$ of the projections 11 at a height of 0.8 L. In other words, $D_{0.3} > D_{0.8}$ is preferred. Here, the height of the projections 11 is the length of a perpendicular drawn from an extreme tip end of the projections 11 in the extending direction of the projections 11 (hereinafter simply referred to as the "extreme tip end of the projections 11") to the surface of the base 10. In the case where the extreme tip end of the projections 11 is formed of a flat surface and the flat face is parallel to the surface of the base 10, the length of a perpendicular drawn from any point on the flat surface of the extreme tip end of the projections 11 to the surface of the base 10 is referred to as a height L of the projections 11.

It should be noted that when the interfaces between the base 10 and the projections 11 are clearly identified as in FIG. 2, the height L of each projection 11 is defined as described above; however, when the interfaces between the base 10 and the projections 11 are not clearly identified, the height L of each projection 11 is defined as follows.

First, a cross section of the current collector in its thickness direction (herein after simply referred to as the "cross section of the current collector") is determined such that the cross section of the current collector includes the extreme tip end of the projections and the cross-sectional area of the projections becomes largest.

In the cross section of the current collector, a depressed surface exists between adjacent projections. With respect to two depressed surfaces on both sides of one projection, a most depressed point in the direction normal to the surface of the current collector in each of the two depressed surfaces is determined. A line segment connecting the two most depressed points thus determined is drawn. Then a straight line passing through the midpoint of the line segment and being perpendicular to the direction normal to the surface of the current collector is drawn, which is used as a reference line. A perpendicular is drawn from the extreme tip end of the projection to the reference line, and the length of the perpendicular is referred to as the height L of the projection.

The height of 0.3 L corresponds to a position at which, in a perpendicular drawn from an extreme tip end of the projections 11 to the surface of the base 10 or the above-described reference line, the length of the perpendicular measured from the surface of the base 10 or the reference line is 0.3 L. The diameter $D_{0.3}$ of the projections 11 means a cross-sectional width of the projections 11 at a height of 0.3 L. The cross-sectional width of the projections 11 means, as described above, a width (length) measured parallel to the surface to the base 10 or the reference line in the cross section of the projections 11. Likewise, the diameter $D_{0.8}$ of the projections 11 means a cross-sectional width of the projections 11 at a height of 0.8 L.

By shaping the projections 11 so as to have the cross section as described above, it is possible to disperse or relieve the stress generated between the base 10 and the projections 11 due to the expansion of an active material layer to be carried on the surfaces of the projections 11. When $D_{0.3} = D_{0.8}$, the stress generated in the projections 11 tends to be concentrated at the interfaces between the base 10 and the projections 11, and consequently, the projections 11 may be separated from the base 10.

The ratio $(D_{0.5}/D_{0.3})$ of a diameter $D_{0.5}$ at a height of 0.5 L to the diameter $D_{0.3}$ at a height of 0.3 L is preferably 0.98 or less, and more preferably 0.4 to 0.9. Here, the diameter $D_{0.5}$ at a height of 0.5 L means, similarly to the above, a cross-sectional width of the projections 11 at a height of 0.5 L.

When $D_{0.5}/D_{0.3}$ exceeds 0.98, the shape of the projections 11 approaches a cylinder or a reverse truncated cone, and because of this, the stress may tend to be concentrated at the interfaces between the base 10 and the projections 11. As a result, the separation of the projections 11 from the base 10 may occur more frequently.

The ratio $(D_{0.8}/D_{0.5})$ of the diameter $D_{0.8}$ at a height of 0.8 L to the diameter $D_{0.5}$ at a height of 0.5 L is preferably 0.4, and more preferably 0.5 to 0.95. When $D_{0.8}/D_{0.5}$ is less than 0.4, the projections 11 have sharp ends which are susceptible to deformation, and consequently stable characteristics may not be obtained.

The height L of the projections 11 is not particularly limited, but is preferably 1 to 20 μm and more preferably 3 to 10 μm. When the length L of the projections 11 is less than 1 μm, the effect of relieving the stress may become insufficient. When the length L of the projections 11 exceeds 20 μm, the ratio of the volume of the projections 11 to that of the electrode is increased, and consequently a practical high capacity may be difficult to obtain.

In the cross section of the current collector 1 in its thickness direction shown in FIG. 2, angles each formed between a straight line representing a side surface of the projections 11 and a straight line representing the surface of the base 10 surrounding the projections 11 (or a straight line representing the depressed surface 12 surrounding the projections 11) are referred to as angles θ. In the present invention, it is preferable that at least one of the angles θ is an obtuse angle, and it is more preferable that 60% by number or more of the angles θ are obtuse angles. Among the angles θ, an obtuse angle is preferably more than 90° and less than 160°, and more preferably more than 92° and less than 145°. In the case where the recessed surface 12 surrounding the projections 11 is not flat, angles each formed between a straight line representing a side surface of the projections 11 and the above-described reference line are referred to as angles θ. Further, in the case where the line representing a side surface of the projections 11 is a curved line, a tangent of the curved line at the position corresponding to a height of 0.5 L is determined, and angles each formed of this tangent and a straight line representing the surface of the base 10 or the above-described reference line are referred to as angles θ.

The height L, diameter $D_{0.3}$, diameter $D_{0.5}$, diameter $D_{0.8}$ and angle θ of the projections 11 are each determined by measuring any five projections 11 and averaging the values obtained from the measurement.

Figure 3:
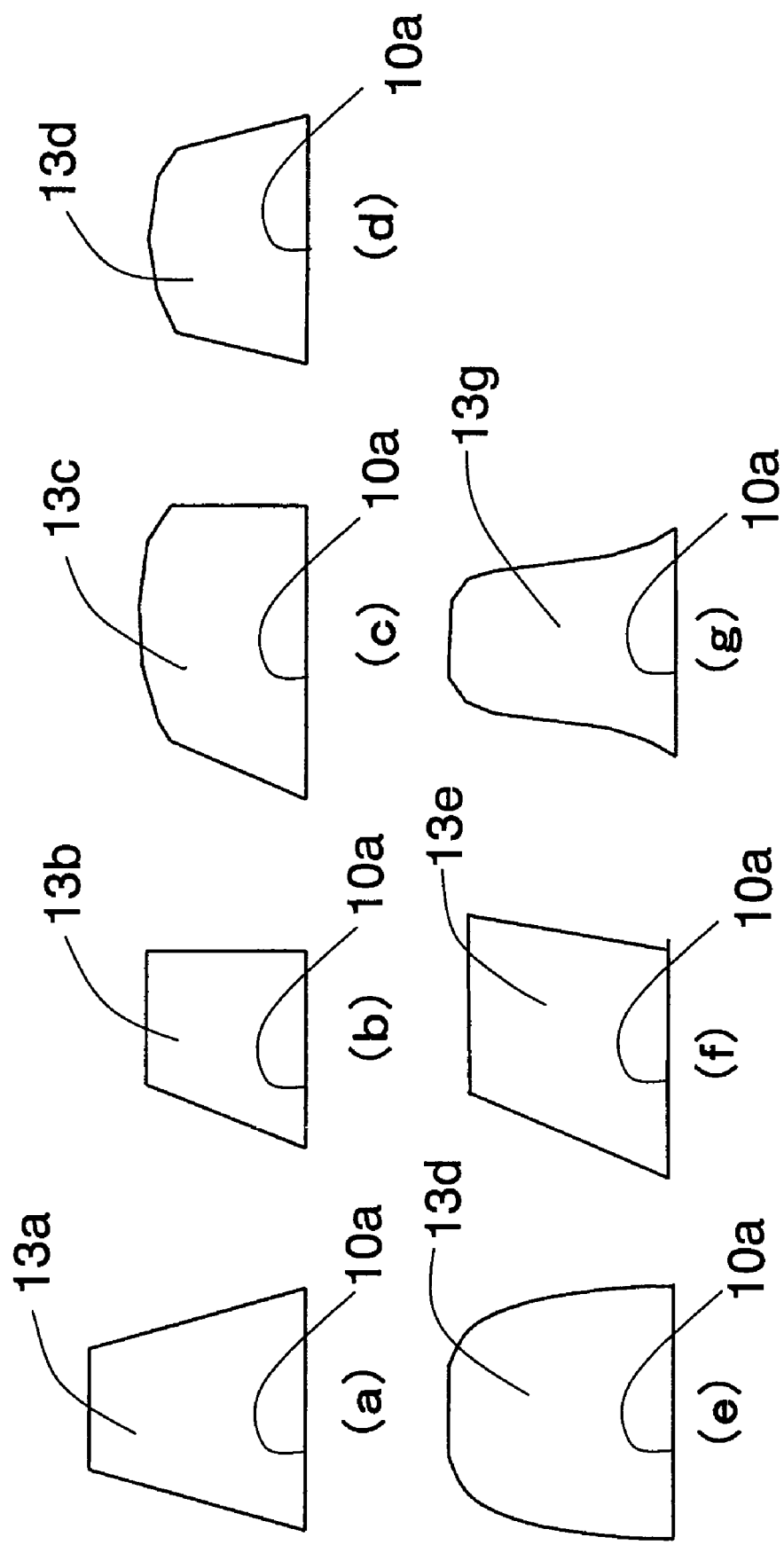
FIG. 3 is a set of longitudinal cross-sectional views showing cross-sectional shapes of projections of other embodiments.

The cross-sectional shape of the projection 11 is not particularly limited as long as the cross section has a tapered shape in which the cross-sectional width of the projections 11 narrows along a direction in which the projections 11 extends, and preferably $D_{0.8} > D_{0.3}$. FIG. 3 is a set of longitudinal cross-sectional views showing cross-sectional shapes of projections 13a to 13g of other embodiments.

In FIG. 3, a line 10a indicates an interface between the projections 13a to 13g and the surface of the base 10 (not shown). The projections 13a to 13g are collectively referred to as projections 13. As shown in FIG. 3(a) to (g), in the cross section of the projections 13, a line representing a side surface of the projections 13 may be a straight line or a curved line. Further, the curved line may be convex toward the surface of the base 10 (not shown) or convex toward an extending direction of the projections 13. In the cross section of the projections 13, a line representing a tip end of the projections 13 may be a straight line or a curved line. In view of enhancing the effect of the present invention, the shape of cross section of the projections 13 is preferably a bell or a spindle as shown in FIG. 3(g). In the projection 13g, since a curve from the side thereof to the surface of the base 10 is convex toward the surface of the base 10, the stress applied to the interface 10a between the projection 13 and the base 10 is effectively dispersed.

The shape of the projection 11 shown from above (shape of the orthographic projection) is not particularly limited. Examples of the shape include a circle, an ellipse, a polygon, a sector, a crescent, and the like. As the polygon, a triangle, a square, a pentagon, a hexagon, and the like are preferred, and among these, a regular triangle, a regular square, a regular pentagon, a regular hexagon, and the like are particularly preferred.

Further, on at least part of the surface of the projection 11, a projecting matter extending outwardly from the surface of the projection 11 may be formed. One or two or more projecting matters may be formed. The projecting matter is preferably smaller than the projection 11.

The arrangement of the projections 11 on the surface of the base 10 is not particularly limited, but preferably the projections 11 are arranged in a regular pattern. This allows the space for relieving the expansion stress of the active material to be present in a regular pattern in the electrode. This consequently prevents the deformation of the electrode effectively. Moreover, when the active material layers carried on the projections 11 expand, the contacts between adjacent active material layers to each other can be decreased. The projections 11 are preferably arranged on the base 10, for example, in a staggered pattern, a grid pattern, and the like.

The production method of the current collector 1 is not particularly limited, but a partial compression is preferred. The partial compression is a method of forming the projections 11 by utilizing plastic deformation of a material, without applying compressive force such as pressure to the projections 11 themselves. The advantages of the partial compression include the followings.

The durability of the obtained current collector 1 is improved, and thus the separation of the projections 11 from the base 10 can be prevented. Moreover, in forming the projections 11 or forming active material layers on the surfaces the projections 11, the occurrence of local deformation, deflection, and the like on the base 10 can be prevented. In addition, the bonding strength between the surfaces of the projections 11 and the active material layers is increased, and thus the separation of the active material layers from the surfaces of projections 11 can be remarkably reduced in the steps of forming active material layers, slitting in the production of an electrode, and other steps.

For these advantages, when an electrode including the current collector 1 with active material layers formed thereon is incorporated in a battery, the obtained battery will be a highly reliable battery that exhibits little deterioration in performance after a long time use.

In the case where the extreme tip ends of the projections 11 in the extending direction of the projections 11 have a flat surface, since the flat surface is formed without undergoing compression and is free from the influence of distortion due to processing, and the like, the surface roughness of a raw material sheet for current collector before partial compression is maintained. Therefore, as long as the surface roughness of a raw material sheet for current collector is adjusted within an optimum range, the active material layers can be formed in a precise and easy manner without the need of adjusting of the surface roughness after the formation of the projections 11. It should be noted that it is easy to adjust the surface roughness of a raw material sheet for current collector.

Specific examples of the partial compression include a method using a roller having recesses on the surface thereof (hereinafter referred to as a "roller method"), etching, photolithography, and the like. Among these, in view of preventing the separation of the projections 11 from the base 10, the roller method and etching are preferred. In view of producing the current collector 1 at low costs with good productivity, the roller method is preferred.

According to the roller method, the current collector 1 can be produced using a roller with recesses formed thereon, by mechanically pressing a raw material sheet for current collector, thereby subjecting the sheet to partial plastic deformation. In this method, the projections 11 are formed on at least one surface of the raw material sheet for current collector in correspondence to the recesses 16 arranged on the surface of the roller.

Figure 4:
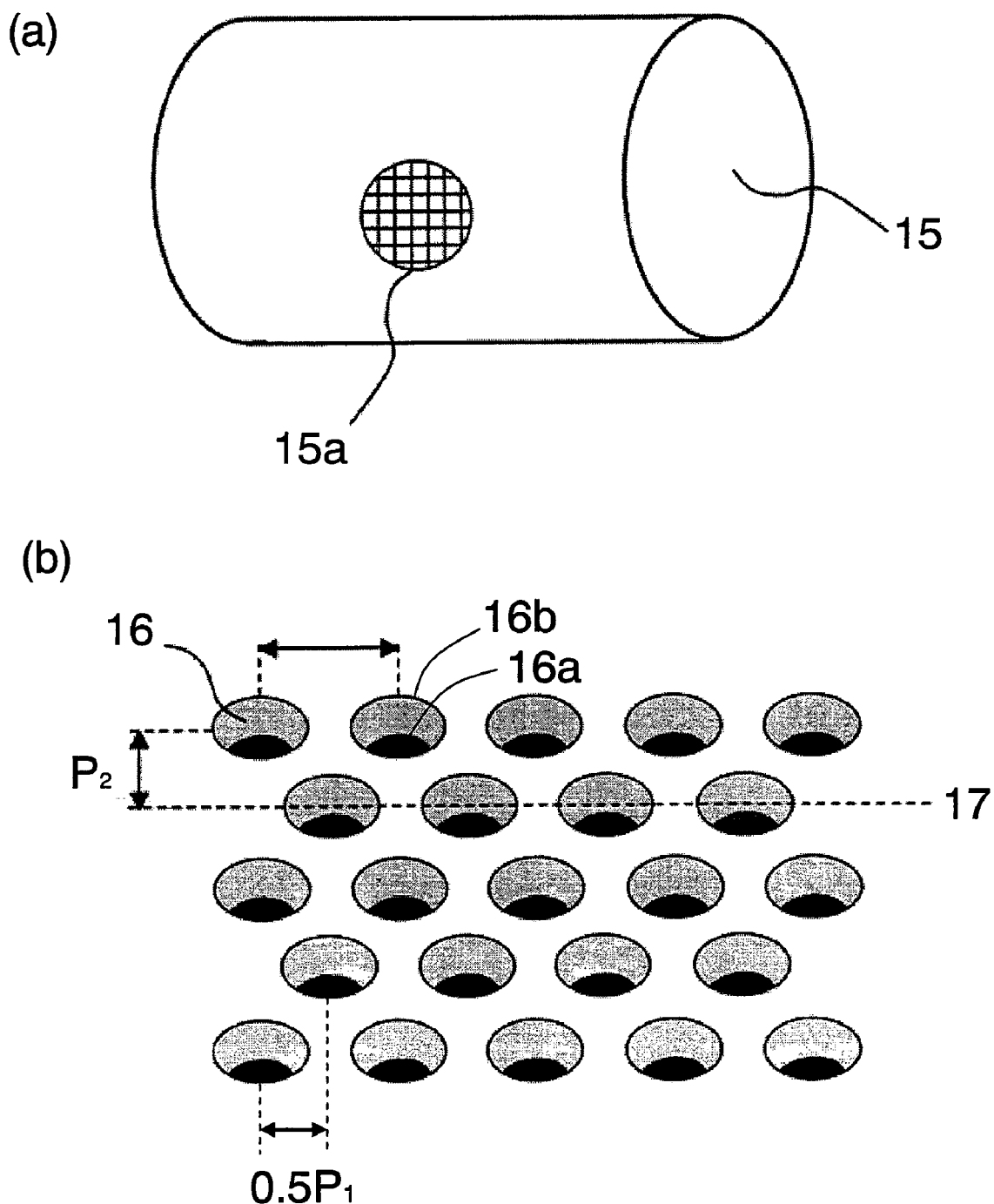
FIG. 4 a set of drawings showing a configuration of a roller used for a roller method.
Figure 5:
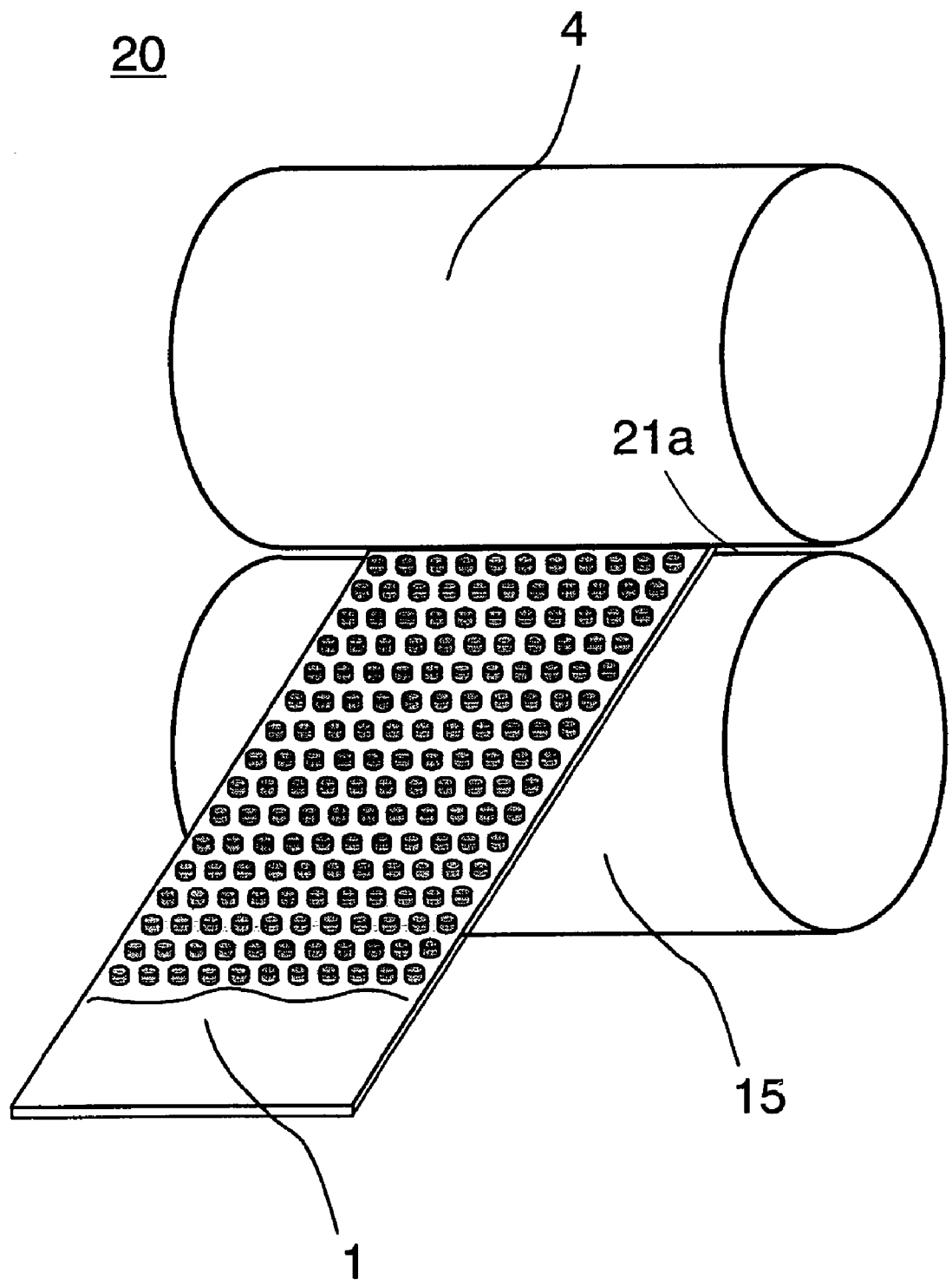
FIG. 5 is a perspective view schematically showing a configuration of a main part of a current collector production apparatus including the roller shown in FIG. 4.
Figure 6:
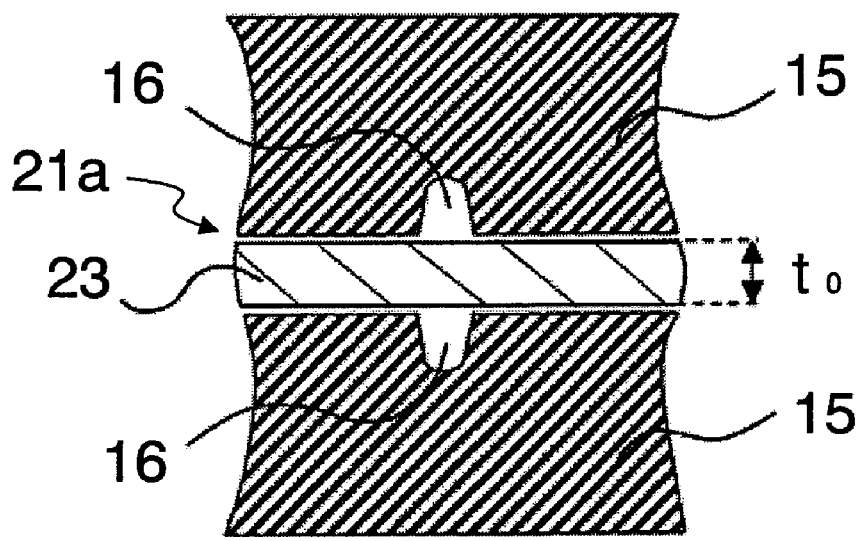
FIG. 6 is a series of longitudinal cross-sectional views explaining plastic deformation by the roller method.
Figure 6:
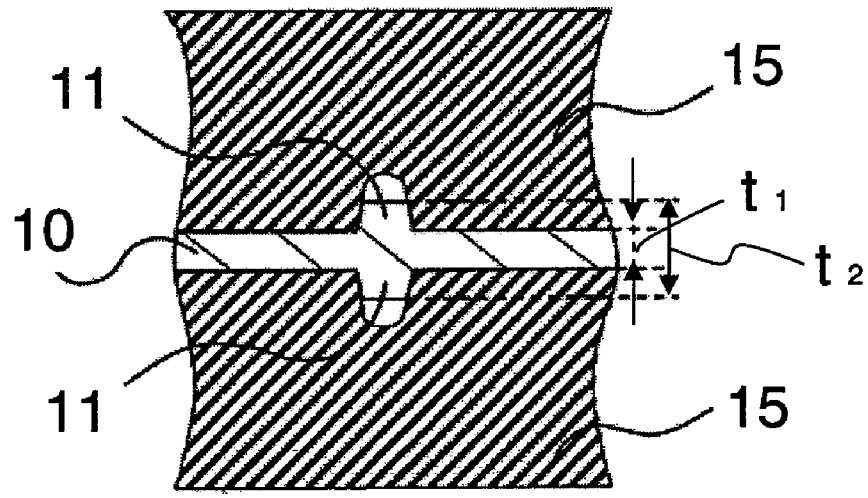
Figure 6:
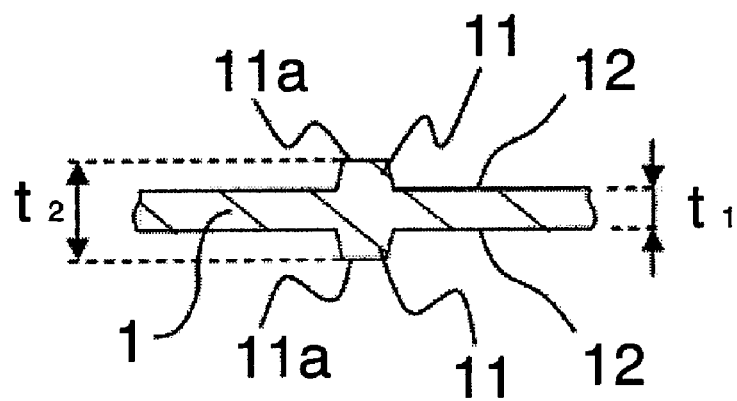

FIG. 4 a set of drawings showing a configuration of a roller 15 used for the roller method. FIG. 4(a) is a perspective view showing an appearance of the roller 15. FIG. 4(b) is an enlarged perspective view showing a surface region 15a of the roller 15 shown in FIG. 4(a). FIG. 5 is a perspective view showing a configuration of a main part of a current collector production apparatus 20 including the roller 15 shown in FIG. 4. FIG. 6 is a series of longitudinal cross-sectional views explaining plastic deformation by the roller method.

On the surface of the roller 15, a plurality of recesses 16 are formed. When the projections 11 are assumed to be male projections, the recesses 16 may be formed as female recesses whose shape approximately corresponds to the shape of the projections 11.

The recesses 16 are preferably formed such that the cross section thereof in the direction normal to the surface of the roller 15 (hereinafter simply referred to as a "recess cross section") has a tapered shape. This tapered shape is a shape in which the width of the recess cross section in a direction parallel to the surface of the roller 15 (i.e., the direction perpendicular to the radius of the roller 15) gradually or continuously broadens from a bottom 16a of the recess 16 toward an opening 16b of the recess 16 on the surface of the roller 15. When the recess cross section has a tapered shape, the projections 11 in which $D_{0.3} > D_{0.8}$ are easily formed. The recesses 16 formed such that the cross section thereof has a tapered shape have a side surface inclined with respect to the direction normal to the surface of the roller 15. The ratios $D_{0.5}/D_{0.3}$ and $D_{0.8}/D_{0.5}$ can be adjusted to a desired value by suitably selecting the inclined angle of the side surface.

The arrangement pattern of the recesses 16 on the surface of the roller 15 in this embodiment is as follows. A plurality of the recesses 16 aligned in a row so as to be spaced apart from one another at a pitch $P_1$ in the longitudinal direction of the roller 15 is referred to as one row unit 17. A plurality of the row units 17 are arranged in the circumference direction of the roller 15 at a pitch $P_2$. The pitch $P_1$ and the pitch $P_2$ may be set as desired. Here, one row unit 17 and another row unit 17 adjacent thereto are arranged so that the recesses 16 are staggered in the longitudinal direction of the roller 15. The staggered distance between the recesses 16 in the longitudinal direction is $0.5P_1$ in this embodiment, but not limited thereto and may be set as desired. The arrangement pattern of the recesses 16 is not limited to the arrangement pattern shown in FIG. 4(b), and various arrangement patterns may be employed.

For the formation of the recesses 16, an optimum method suitably selected from commonly known methods for forming recesses according to various conditions such as the material of the roller, the diameter of the recesses, the depth of the recesses, and the like may be used. Examples of the methods for forming recesses include etching, sandblasting, arc machining, laser machining, and the like. Among these, the laser machining is preferred. According to the laser machining, very minute recesses can be formed in an accurate arrangement pattern. Examples of a laser used for the laser machining include a carbonic acid gas laser, a YAG laser, an excimer laser, and the like. As the roller for forming the recesses 16, a metallic roller, a metallic roller having a coating layer, and the like may be used. Examples of the material of the roller include stainless steel, chromium-molybdenum steel, and the like. The coating layer contains, for example, at least one selected from alumina, titanium dioxide, chromium oxide, zirconia, silicon nitride, aluminum nitride, titanium nitride, tungsten carbide, silicon carbide, aluminum carbide, and the like. The roller 15 is thus obtained.

The roller 15 is mounted, for example, on the current collector production apparatus 20 shown in FIG. 5 and is used for producing the current collector 1. The current collector production apparatus 20 includes a compression means 21 and a raw material sheet transferring means (not shown).

The compression means 21 includes two rollers 15. The rollers 15 are each axially supported by a driving means (not shown) in such a manner that each roller is rotatable around the axis, the axes of the rollers are in parallel to each other, and the rollers are in press contact with each other to form a press nip 21a. The rollers 15 are arranged so as to be symmetrically opposite to each other at the press nip 21a with the raw material sheet for current collector interposed therebetween. With the passage of the raw material sheet for current collector through the press nip 21a, local plastic deformation occurs on the surfaces of the raw material sheet for current collector according to the arrangement pattern of the recesses 16 on the surfaces of the rollers 15, whereby the projections 11 are formed.

The raw material sheet transferring means supplies a raw material sheet for current collector to the press nip 21a between the two rollers 15. The raw material sheet transferring means includes, for example, a feeding roller and two or more transferring rollers. Around the feeding roller, a raw material sheet for current collector is wound. The transferring rollers transfer the raw material sheet for current collector fed from the feeding roller, toward the press nip 21a. According to the current collector production apparatus 20, the current collector 1 is obtained by passing the raw material sheet for current collector through the press nip 21a between the two rollers 15. The obtained current collector 1 is wound up, for example, around a take-up roller.

The degree of plastic deformation at the press nip 21a can be adjusted, for example, by suitably selecting the material and thickness of the raw material sheet for current collector, the pressure applied at the press nip 21a, the rotating speed of the rollers 15, the transferring speed of the raw material sheet for current collector by the raw material sheet transferring means, and the like.

The plastic deformation of the raw material sheet for current collector at the press nip 21a is described more specifically with reference to FIG. 6. FIG. 6 is a series of longitudinal cross-sectional views explaining plastic deformation by the roller method. FIG. 6(a) is a longitudinal cross-sectional view showing the state of the raw material sheet 23 for current collector immediately after supplied to the press nip 21a. FIG. 6(b) is a longitudinal cross-sectional view showing the progress of plastic deformation on the surfaces of the raw material sheet 23 for current collector at the press nip 21a. FIG. 6(c) is a longitudinal cross-sectional view of the current collector 1 after passed though the press nip 21a.

As shown in FIG. 6(a), the raw material sheet 23 for current collector has a thickness t at the entrance of the press nip 21a. This raw material sheet 23 is pressed in contact with the surfaces of the two rollers 15. As shown in FIG. 6(b), the portions in the raw material sheet 23 to be in contact with the flat surfaces of the rollers 15 are compressed to have a thickness $t_1$. The thickness $t_1$ is smaller than to. To the contrary, the portions in the raw material sheet 23 facing the recesses 16 of the rollers 15 are not pressed, but instead undergo plastic deformation associated with the compression on the contact portions surrounding the foregoing facing portions. As a result, the facing portions are pushed outwardly from the raw material sheet 23 in the spaces of the recesses 16, and thus formed into the projections 11. In short, the projections 11 are formed without undergoing compression but with undergoing plastic deformation only, namely, formed by partial compression.

As shown in FIG. 6(c), since the projections 11 are formed without undergoing compression, in the extending direction of the projections 11, the flat surfaces 11a at the tip ends of the projections 11 are free from influences of distortion due to processing, and the like, and the same surface condition and the flat surface accuracy as those of the raw material sheet 23 for current collector are maintained.

The side surfaces of the projections 11 have a surface condition similar to that of the raw material sheet 23 for current collector. On the other hand, having been compressed, the depressed surface 12 present between adjacent projections 11 has a surface condition different from that of the raw material sheet 23 for current collector. A maximum thickness $t_2$ of the current collector 1 is a distance between the flat surfaces 11a at the tip ends of the projections 11 formed on both surfaces of the current collector 1 in its thickness direction. The maximum thickness $t_2$ of the current collector 1 is larger than the thickness $t_0$ of the original raw material sheet 23. Here, the relationship between the thickness $t_0$ and the maximum thickness $t_2$ can be adjusted by, for example, suitably selecting the pressure applied at the press nip 21a.

In the current collector 1 obtained by the roller method, there is no boundary between the base 10 and the projections 11, and there is at least one region continuously present from the base 10 to the projections 11, the region having an almost homogeneous crystalline state. The observation of the cross section of the current collector 1 in its thickness direction under an electron microscope reveals that a region having an almost homogeneous crystalline state exists in at least a part of the cross section, the region spreading from the base 10 to the projections 11 without a break therebetween. Insofar as observed under an electron microscope, the crystalline state in this region does not indicate the presence of a joint. With such a configuration, the separation of the projections 11 from the base 10, and further the separation of the active material layers from the projections 11 are effectively suppressed.

Further, according to the roller method, the current collector 1 can be continuously produced easily at low costs. In particular, the product defective rate is extremely low because of a good releasability of the current collector 1 from the rollers 15 after the formation of the projections 11, coupled with the formation of the projections 11 and the recesses 16 so as to have a tapered cross section. For this reason, this method is excellent in mass-productivity.

In the roller method, in place of the roller with recesses formed on its surface, a die with recesses formed on its surface can be used, with the same effect, to produce the current collector of the present invention. The recesses can be formed on the die in the same manner as on the surface of the roller. Alternatively, a die including recesses on its surface may be designed.

According to the etching method, which is another example of the partial compression other than the roller method, the current collector 1 can be produced by etching a raw material sheet for current collector in a predetermined pattern. As a means for etching, for example, a laser, chemicals, and the like can be used. The current collector 1 produced by this method also has no boundary between the base 10 and the projections 11 and includes at least one region continuously spreading from the base 10 to the projections 11, the region having an almost homogeneous crystalline state. As such, the possibility that the projections 11 are separated from the base 10 is extremely low.

Further, according to the photolithography, first, a resist pattern is formed on the surface of the base 10. Secondly, the base 10 with the resist pattern formed thereon is subjected to electrolytic plating or electropainting, whereby the projections 11 are formed on the surface of the base 10. In this method, a discontinuous boundary is often formed between the base 10 and the projections 11.

Figure 7:
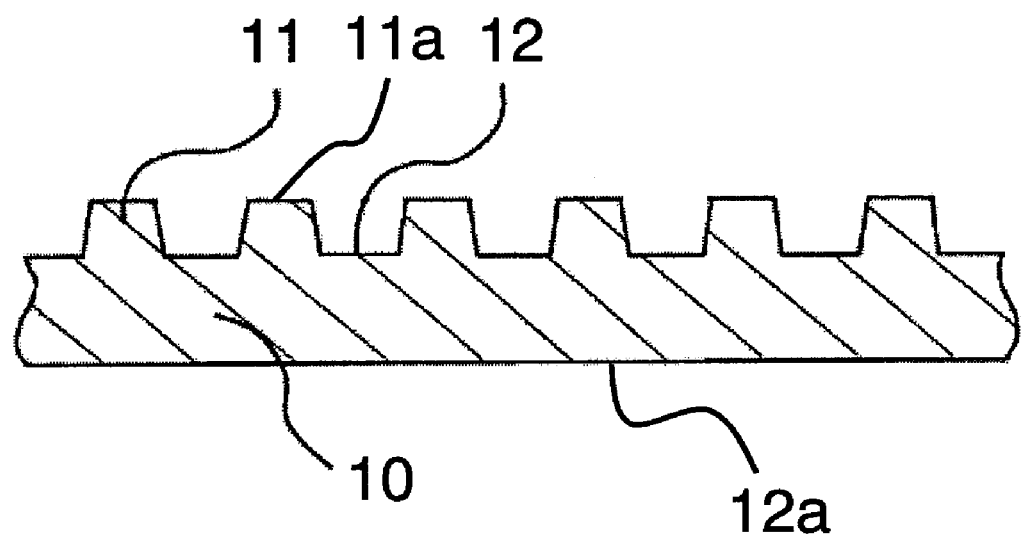
FIG. 7 is a longitudinal cross-sectional view showing a configuration of a current collector of another embodiment produced by the roller method.

FIG. 7 is a longitudinal cross-sectional view schematically showing a configuration of a current collector of another embodiment. The current collector 25 is analogous to the current collector 1, and the corresponding parts are denoted by the same reference numerals, with the description thereof omitted. The current collector 15 is characterized by including the base 10 and the projections 11, the projections 11 being formed on one surface of the base 10 in its thickness direction. As in this embodiment, the projections 11 may be formed on one surface of the base 10 in its thickness direction.

Figure 8:
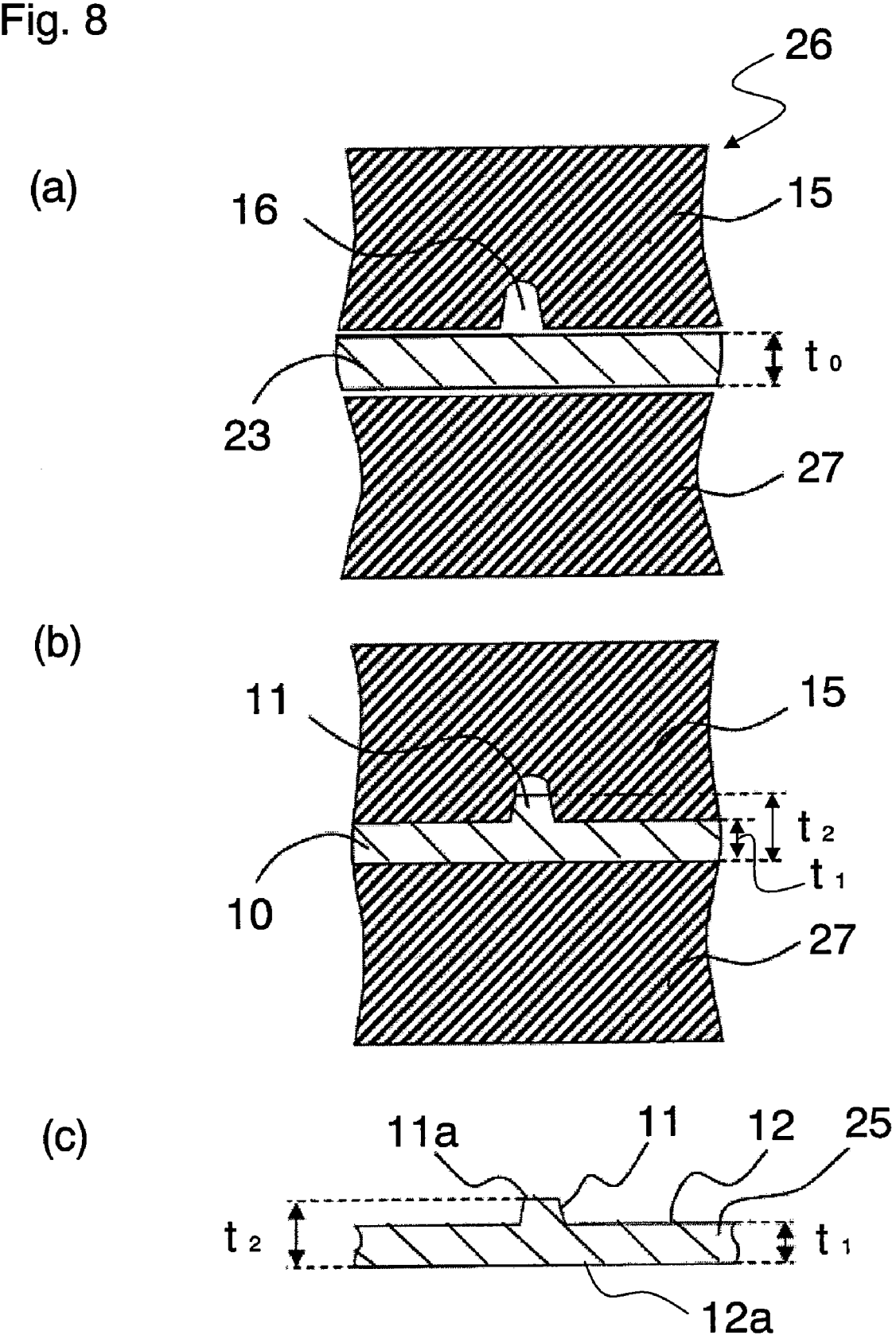
FIG. 8 is a series of longitudinal cross-sectional views explaining plastic deformation by the roller method of another embodiment.

A method of producing the current collector 25 by the roller method is described with reference to FIG. 8. FIG. 8 is a series of longitudinal cross-sectional views explaining plastic deformation by the roller method of another embodiment, namely, longitudinal cross-sectional views explaining a method of producing the current collector 25. FIG. 8(*a*) is a longitudinal cross-sectional view showing the state of the raw material sheet 23 for current collector immediately after supplied to a press nip 28. FIG. 8(*b*) is a longitudinal cross-sectional view showing the progress of plastic deformation on the surface of the raw material sheet 23 for current collector at the press nip 28. FIG. 8(*c*) is a longitudinal cross-sectional view of the current collector 25 after passed though the press nip 28.

In the step shown in FIG. 8(*a*), the raw material sheet 23 for current collector is supplied to the press nip 28 in a current collector production apparatus 26. In this step, the raw material sheet 23 for current collector has a thickness t. The current collector production apparatus 26 has the same configuration as the current collector production apparatus 20 except that one of the two rollers forming the press nip 28 is the roller 15 and the other is a roller 27. The roller 27 has a flat surface with no recesses formed thereon.

In the step shown in FIG. 8(*b*), the raw material sheet 23 for current collector is pressed in its thickness direction. The surfaces of the raw material sheet 23 for current collector are divided into non-contact surfaces facing the recesses 16 of the roller 15 and a contact surface surrounding the non-contact surfaces and being brought into contact with the surface of the roller 15 or the roller 27. The contact surfaces are compressed and formed into the base 10. The base 10 has a thickness $t_1$. The thickness $t_1$ is smaller than $t_0$. On the other hand, the non-contact surfaces undergo plastic deformation associated with the compression on the contact surfaces and are pushed toward the bottoms of the recesses 16, whereby the projections 11 are formed. In short, the projections 11 are formed without undergoing compression.

In the current collector 25 shown in FIG. 8(*c*), since the projections 11 are formed without undergoing compression, the flat surfaces 11*a* at the tip ends of the projections 11 in the extending direction of the projections 11 have the same surface condition as that of the raw material sheet 23 for current collector. The side surfaces of the projections 11 have a surface condition similar to that of the raw material sheet 23 for current collector. On the other hand, having been compressed, both the depressed surface 12 present between adjacent projections 11 and a surface 12*a* in the other side of the base 10 opposite to the side where the projections 11 are formed have a surface condition different from that of the raw material sheet 23 for current collector. The flat surfaces 11*a* at the tip ends of the projections 11 are approximately parallel to the surface 12*a* in the opposite side of the base 10, and a maximum thickness $t_2$, which is a distance between the flat surfaces 11*a* and the surface 12*a*, is larger than the thickness $t_0$ of the original raw material sheet 23 for current collector.

[Electrode]

The electrode of the present invention is characterized by including the current collector of the present invention and an active material layer.

The current collector of the present invention is as described above.

The active material layer preferably contains a plurality of columnar particles. The columnar particles contain an active material and are formed so as to extend outwardly from at least part of a surface of the current collector. By virtue of the configuration of the active material layer including a plurality of columnar particles, the expansion stress of the active material can be easily relieved. The shape of the columnar particle is not particularly limited, but preferably, for example, a cylinder, a truncated cone, a reverse truncated cone, a prism, a truncated pyramid, a reverse truncated pyramid, and the like. The active material layer is formed one surface or both surfaces of the current collector in its thickness direction, but preferably, in view of achieving a high capacity in a finally obtained battery, formed on both surfaces. As for the thickness of the active material layer (the height of the columnar particles), it suffices if the thickness is such that the influence due to the expansion of the active material is deemed acceptable.

Figure 9:
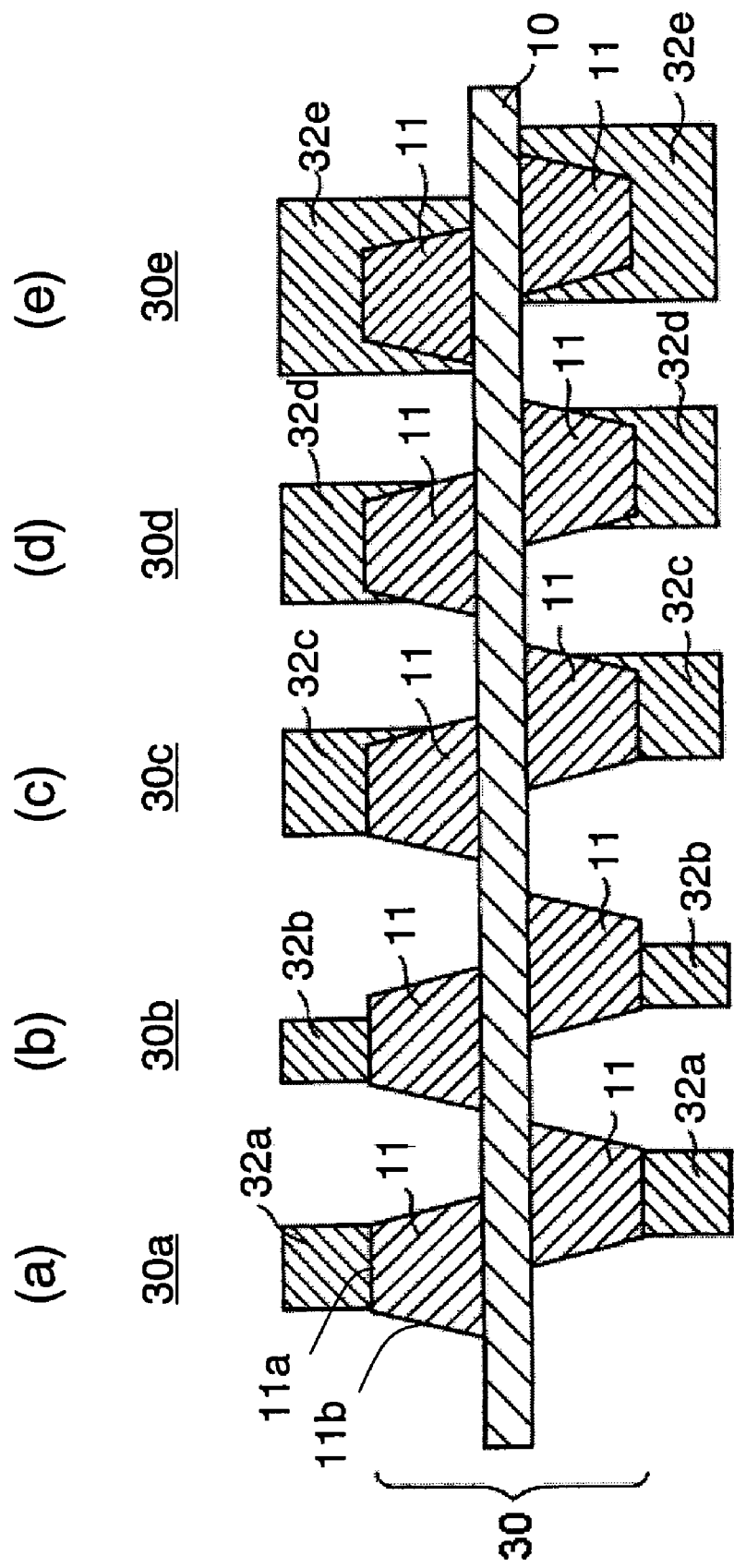
FIG. 9 is a longitudinal cross-sectional view schematically showing a configuration of an electrode of the present invention.

FIG. 9 is a longitudinal cross-sectional view schematically showing a configuration of an electrode 30 of the present invention. The electrode 30 is a collective term for electrodes 30*a*, 30*b*, 30*c*, 30*d* and 30*e*, and includes a current collector 31 and a columnar particle 32 serving as an active material layer. The current collector 31 is analogous to the current collector 1, and the corresponding parts are denoted by the same reference numerals, with the description thereof omitted. The current collector 31 is the same as the current collector 1 in that the projections 11 are formed on both surfaces of the base 10 in its thickness direction, but is different from the current collector 1 in that the projections 11 on both surfaces of the base 10 are not positioned so as to face each other with the base 10 interposed therebetween, and are arranged such that the projections 11 on one surface and the projections 11 on the other surface are displaced from each other. The current collector 1 may be used in place of the current collector 31.

The columnar particle 32 is a collective term for columnar particles 32*a*, 32*b*, 32*c*, 32*d* and 32*e*. The columnar particle 32*a* shown in FIG. 9(*a*) is formed so as to extend from the entire flat surface 11*a* at the tip end of the projection 11 in its extending direction (hereinafter simply referred to as the "flat surface 11*a*") outwardly from the current collector 31. The columnar particle 32*b* shown in FIG. 9(*b*) is formed so as to extend from a part of the flat surface 11*a* outwardly from the current collector 31. The columnar particles 32*c* and 32*d* shown in FIGS. 9(c) and 9(c) are formed so as to extend from the entire flat surface 11a and a part of a side surface 11b of the projection 11 in its extending direction (hereinafter simply referred to as the "side surface 11b") outwardly from the current collector 31. The columnar particle 32e shown in FIG. 9(e) is formed so as to extend from the entire flat surface 11a and side surface 11b and a part of the depressed surface 12 outwardly from the current collector 31.

As described above, the columnar particle 32 may be formed on at least part of the flat surface 11a of the projection 11. Further, the columnar particle 32 may be formed on at least part of the flat surface 11a and at least part of the side surface 11b of the projection 11. Furthermore, the columnar particle 32 may be formed on at least part of the flat surface 11a and at least part of the side surface 11b of the projection 11, and at least part of the depressed surface 12.

The columnar particle 32 can be formed according to a commonly known method for forming a thin film, such as vacuum vapor deposition, sputtering, chemical vapor deposition (CVD), and the like. According to the vacuum vapor deposition, for example, vapor of active material is deposited on the surface of the current collector 31 obliquely, and thus the columnar particles 32 are formed. At this time, since the incident vapor of active material is partly blocked by the projections 11, the vapor of active material is selectively deposited on a predetermined portion of the surface of the current collector 31.

Figure 10:
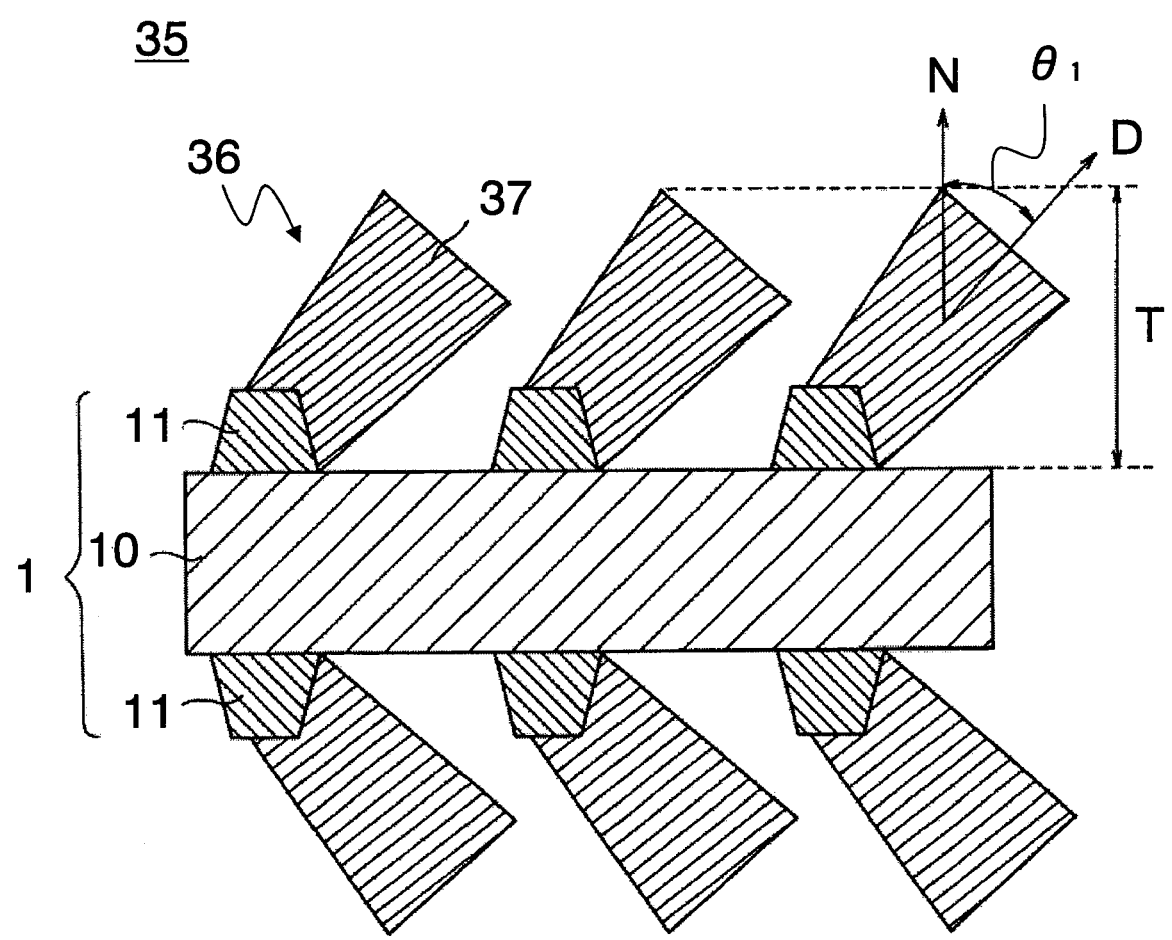
FIG. 10 is a longitudinal cross-sectional view schematically showing a configuration of an electrode of another embodiment.

FIG. 10 is a cross-sectional view schematically showing a configuration of an electrode 35 of another embodiment. The electrode 35 includes the current collector 1 and an active material layer 36. The electrode 35 is characterized by including the active material layer 36.

The active material layer 36 includes a plurality of columnar particles 37. The columnar particles 37 are characterized by being inclined with respect to the direction N normal to the surface of the current collector 1. Specifically, the columnar particles 37 are formed such that the direction N normal to the surface of the current collector 1 and an extending direction of the columnar particles 37 outwardly from the surface of the current collector 1 (hereinafter referred to as a "growth direction D") form angles $\theta_1$.

The surface of a current collector is flat when viewed with naked eyes, but is rough when viewed microscopically. Accordingly, in the present specification, if the surface of the current collector is flat when viewed microscopically, a direction normal to the current collector is exactly what it means. On the other hand, if the surface of the current collector is rough when viewed microscopically, a direction normal to the surface of the current collector is, assuming that the current collector is placed on a horizontal plane, a direction normal to the horizontal plane.

The growth direction D2 of the columnar particles 37 can be adjusted as desired. In forming the columnar particles 37, for example, a vacuum vapor deposition apparatus (not shown) is used. The vacuum vapor deposition apparatus includes a current collector fixing table being pivotally supported and used for fixing a current collector, and a target being provided vertically below the current collector fixing table and used for supplying vapor of active material vertically upward. In this vacuum vapor deposition apparatus, the current collector 1 is fixed on the current collector fixing table so as to face vertically downward. While the angle formed between the surface of the current collector 1 and the horizontal plane is adjusted appropriately, vapor of active material is supplied from the target, thereby to form columnar particles 37. At this time, the growth direction D2 of the columnar particles 37 is dependent on the angle formed between the surface of the current collector and the horizontal plane. When viewed microscopically, the growth direction D2 of each columnar particle 37 is an extending direction of an active material grain included in the columnar particle 37.

The columnar particles 37 are disposed so as to be spaced apart from the adjacent columnar particles 37. This space relieves the expansion stress of the active material.

In this embodiment, the side surfaces of the columnar particles 37 in the extending direction outwardly from the surface of the current collector 1 (hereinafter referred to as a "growth direction") are nearly smooth but not limited thereto, and may be rough. Moreover, the columnar particles 37 are each depicted as one particulate matter but not limited thereto, and may be a particulate matter formed of a stack of two or more minute columnar bodies. In the latter case, the boundaries between the columnar bodies in the side surface of the columnar particle 37 form a bend. All of the columnar bodies may be inclined in the same direction, or each of the columnar bodies may be inclined in different directions.

The shapes of the columnar particles 32 and 37 are not particularly limited. The columnar particles 32 and 37 grow into a shape dependent on the shape of the flat surface 11a at the tip end of the projections 11. For example, when the tip end flat surface 11a of the projections 11 is circular, the columnar particles 32 and 37 are formed into a shape of cylinder, truncated cone, reverse truncated cone, and the like according to the formation conditions thereof. The diameters of the columnar particles 32 and 37 may be varied along the longitudinal directions thereof. The columnar particles 32 and 37 are carried on at least part of the surface of the projection 11, but may be partly carried on a portion other than the projections 11. The portions on which the columnar particles 32 and 37 are carried can be controlled by adjusting the height of the projections 11 and the angle formed between the surface of the current collector 1 or 31 and the horizontal plane in the vacuum vapor deposition apparatus.

The thickness T of the active material layer 36 is suitably selected according the design performance of a finally produced battery, but preferably about 3 to 40 μm, more preferably 5 to 30 μm, and particularly preferably 10 to 25 μm. When the thickness T of the active material layer is less than 3 μm, the proportion of the active material in the entire battery becomes small, and the energy density of the battery may be reduced. On the other hand, when the thickness T of the active material layer 36 exceeds 40 μm, the stress in the interfaces between the current collector 1 and the columnar particles 37 is increased, and the deformation of the current collector 1, and other troubles may occur. Here, the thickness T of the active material layer is determined by measuring the heights of any ten columnar particles 37 separately, and averaging the measured values. The height of the columnar particle 37 is the length of a perpendicular drawn from a furthest possible point of the columnar particle 37 away from the surface of the current collector 1 or the foregoing reference line to the surface of the current collector 1 or the reference line.

In view of relieving the stress due to expansion of the active material, it is preferable that the active material layer 36 preferably has a predetermined porosity. The porosity P of the active material layer is determined from the weight and thickness of a certain area of the active material layer and the true density of the active material included therein. More accurate measurement of porosity P is possible by a method using a porosimeter of gas adsorption type or mercury intrusion type, and the like.

The porosity P of the active material layer 36 is suitably selected according to the degree of expansion of the active material when lithium is absorbed therein, but preferably about 10 to 70%, and more preferably 30 to 60%. A porosity P of more than 10% is considered sufficient for relieving the stress due to expansion and contraction of the columnar particles 37. With such a porosity, the columnar particles 37 and the electrolyte are brought into contact with each other at a sufficient level. A porosity P in a range of 30 to 60% can suppress, for example, the drop in capacity during quick charge/discharge. Even with a porosity P exceeding 70%, the active material layer is suitably applicable as an electrode depending on the application of the battery.

It should be noted, that in the present invention, in the measurements of the porosity of the active material layer, the thickness of the active material layer, the diameter or cross-sectional shape of the columnar particles, and the like, when the active material layer is a negative electrode active material layer, the active material is preferably in a fully discharged state. The fully discharged state means a state in which the active material contains lithium in an amount corresponding to the irreversible capacity, and does not contain lithium in an amount corresponding to the reversible capacity (i.e., a state in which the reversible capacity is zero). The fully discharged state corresponds to a state in which the volume of the negative electrode active material layer in a finished battery is the minimum.

It should be noted that the measurements may be performed while the active material does not contain lithium in an amount corresponding to the irreversible capacity, and the obtained measurement value is corrected to give a value in a fully discharged state. For example, the following correction is preformed to determine a porosity P. First, porosity $P_B$ of an active material layer that does not contain lithium at all is measured, for example, using a mercury porosimeter. Secondly, the volume of an active material layer in a fully discharged state and the volume of the active material layer that does not contain lithium at all are measured, to give a volume difference $\Delta V$. Porosity $P_A$ of an active material layer in a fully discharged state is calculated as $P_A = P_B - \Delta V$.

When the active material layer is a positive electrode active material layer, the measurements of the porosity of the active material layer, the thickness of the active material layer, the diameter or cross-sectional shape of the columnar particles, and the like are preferably performed with respect to an active material layer in a state immediately after initial charge/discharge. Alternatively, the measurements may be performed while the active material layer is not in a state immediately after initial charge/discharge, and the obtained measurement value is corrected to give a value in a state immediately after initial charge/discharge. For example, first, porosity $P_Y$ of an active material layer that has not undergone charge/discharge at all is measured, for example, using a mercury porosimeter. Secondly, the volume of an active material layer in a state immediately after initial charge/discharge and the volume of the active material layer that has not undergone charge/discharge at all are measured, to give a volume difference $\Delta V$. Porosity $P_X$ of an active material layer in a state immediately after initial charge/discharge is calculated as $P_X = P_Y - \Delta V$.

When the electrode of the present invention is used as the negative electrode, it is preferable that the active material is an alloy-based negative electrode active material containing at least one selected from the group consisting of silicon, tin, germanium, and aluminum, and/or a compound containing the alloy-based negative electrode active material. The compound containing the alloy-based negative electrode active material is at least one selected from the group consisting of an alloy, an oxide, and a sulfide containing at least one alloy-based negative electrode active material. The alloy containing an alloy-based negative electrode active material is an alloy containing two or more of the above-listed alloy-based negative electrode active materials. The oxide containing an alloy-based negative electrode active material is exemplified by $SiO_x$, where $0<x<2$, and $SnO_x$, where $0<x<2$. In $SiO_x$, x representing the content ratio of oxygen is preferably 0.01 to 1 in view of practical use. The sulfide containing an alloy-based negative electrode active material is exemplified by $SiS_x$, where $0<x<2$, and SnS. Among these, the alloy-based negative electrode active material, the oxide containing an alloy-based negative electrode active material, and the like are preferred, and silicon, $SiO_x$, and the like are particularly preferred. Here, impurities, such as Al, Fe, and Ca, may be contained in the active material to such a degree that the impurities have little or no influence on the absorption and desorption of lithium.

When the electrode of the present invention is used as the positive electrode, it is preferable that the active material is a lithium-containing transition metal oxide. As the lithium-containing transition metal oxide, any known lithium-containing transition metal oxide may be used without any particular limitation, and $LiCoO_2$, $LiNiO_2$, $LiMn_2O_4$, $LiMnO_2$, $LiNi_aCo_{1-a}O_2$, and $LiNiCo_bMn_cO_2$, where $a+b+c=1$; and a modified material of these obtained by solid-dissolving aluminum, magnesium, or the like therein are preferably used. Alternatively, a lithium-free metal oxide such as $MnO_2$ may be used as the active material. Among these, in view of achieving a higher capacity and putting into practical use, $LiCoO_2$ and the like are preferred.

[Non-Aqueous Electrolyte Secondary Battery]

The non-aqueous electrolyte secondary battery of the present invention includes the electrode of the present invention, a counter electrode thereof, and a lithium ion conductive non-aqueous electrolyte. In other words, the non-aqueous electrolyte secondary battery of the present invention is a non-aqueous electrolyte lithium secondary battery. When the non-aqueous electrolyte secondary battery of the present invention includes the electrode of the present invention as the negative electrode, no particular limitation is imposed on the structure of the positive electrode. Conversely, when the non-aqueous electrolyte secondary battery of the present invention includes the electrode of the present invention as the positive electrode, no particular limitation is imposed on the structure of the negative electrode. It should be noted that the electrode of the present invention is preferably used as the negative electrode.

Figure 11:
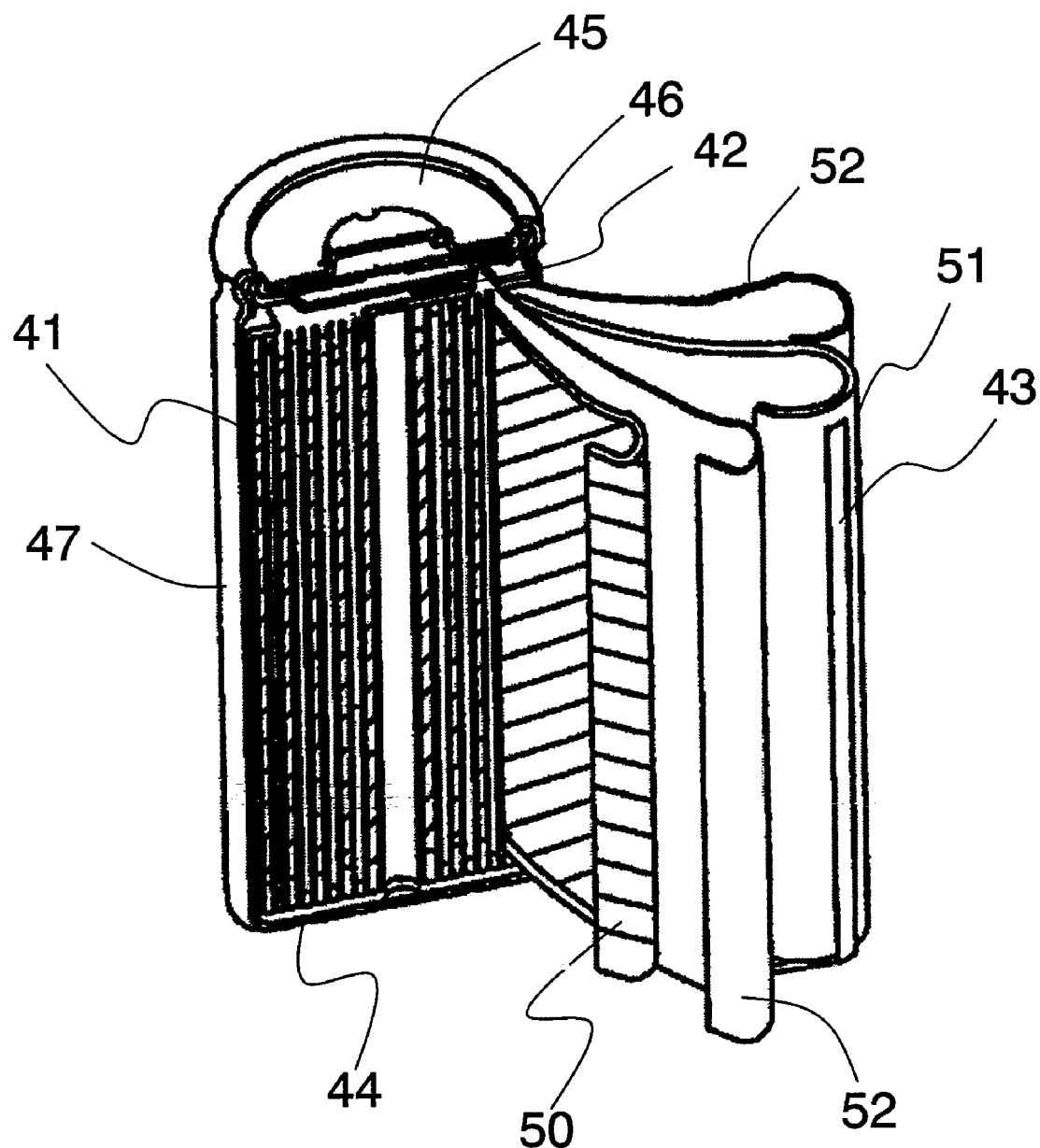
FIG. 11 is a partially exploded perspective view schematically showing a configuration of a wound non-aqueous electrolyte secondary battery as one embodiment of the present invention.

FIG. 11 is a partially exploded perspective view schematically showing a configuration of a non-aqueous electrolyte secondary battery 40 as one embodiment of the present invention. The non-aqueous electrolyte secondary battery 40 includes an electrode plate group 41, a positive electrode lead 42, a negative electrode lead 43, an insulating plate 44, a sealing plate 45, a gasket 46, and a battery case 47.

The electrode plate group 41 includes a positive electrode 50, a negative electrode 51, and a separator 52, in which the positive electrode 50, the separator 52, the negative electrode 51, and the separator 52 are laminated in this order and wound spirally. The electrode plate group 41 includes an electrolyte (not shown).

When the positive electrode 50 is the electrode of the present invention or when the negative electrode 51 is the electrode of the present invention, the electrode includes a positive electrode current collector (not shown) and a positive electrode active material layer (not shown).

As the positive electrode current collector, a commonly used one in this field may be used, examples of which include foils and non-woven fabrics made of aluminum, an aluminum alloy, stainless steel, titanium, and the like. The thickness of the positive electrode current collector is not particularly limited, but preferably 5 μm to 30 μm.

The positive electrode active material layer is formed on one or both surfaces of the positive electrode current collector in its thickness direction and contains a positive electrode active material and, as needed, a conductive agent and a binder. Examples of the positive electrode active material include the above-exemplified lithium-containing transition metal oxides, lithium-free metal oxides such as $MnO_2$, and like.

As the conductive agent, a commonly used one in this field may be used, examples of which include graphites, such as natural graphite and artificial graphite; carbon blacks, such as acetylene black, Ketjen black, channel black, furnace black, lamp black, and thermal black; electrically conductive fibers, such as carbon fiber and metallic fiber; metallic powders, such as carbon fluoride powder and aluminum powder; electrically conductive whiskers, such as zinc oxide whisker and potassium titanate whisker; electrically conductive metal oxides, such as titanium oxide; electrically conductive organic materials, such as phenylene derivatives; and the like.

Examples of the binder include polyvinylidene fluoride (PVDF), polytetrafluoroethylene, polyethylene, polypropylene, aramid resin, polyamide, polyimide, polyamide-imide, polyacrylonitrile, polyacrylic acid, polymethyl acrylate, polyethyl acrylate, polyhexyl acrylate, polymethacrylic acid, polymethyl methacrylate, polyethyl methacrylate, polyhexyl methacrylate, polyvinyl acetate, polyvinylpyrrolidone, polyether, polyethersulfone, hexafluoropolypropylene, styrene-butadiene rubber, carboxymethylcellulose, rubber particle binder having an acrylate unit, and the like. Additional examples of the binder include, copolymers composed of two or more monomer compounds selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, hexadiene, acrylate monomer having a reactive functional group, acrylate oligomer having a reactive functional group, and the like.

The positive electrode 50 is produced, for example, in the following manner. First, a positive electrode material mixture slurry is prepared by mixing and dispersing a positive electrode active material, and, as needed, a conductive agent, a binder, and the like into a dispersion medium. As the dispersion medium, a commonly used dispersion medium in this field, such as N-methyl-2-pyrrolidone, may be used. In mixing and dispersing a positive electrode active material and other materials into a dispersion medium, for example, a generally used dispersion apparatus such as a planetary mixer may be used. The positive electrode material mixture slurry thus obtained is applied onto one or both surfaces of the positive electrode current collector, dried, and then rolled into a predetermined thickness to yield a positive electrode active material layer, whereby the positive electrode 50 is obtained.

When the negative electrode 51 is the electrode of the present invention or when the positive electrode 50 is the electrode of the present invention, the electrode includes a negative electrode current collector (not shown) and a negative electrode active material layer (not shown).

As the negative electrode current collector, a commonly used one in this field may be used, examples of which include metallic foils or metallic films made of copper, nickel, iron, an alloy containing at least one of these, and the like. Among these, metallic foils or metallic films made of copper or a copper alloy, and the like are preferred. As the copper alloy, the copper alloys exemplified herein above may be used. Examples of the metallic foils made of copper or a copper alloy include an electrolytic copper foil, an electrolytic copper alloy foil, a rolled copper foil, a copper alloy foil, a rolled copper alloy foil, a foil obtained by roughening the surface of these foils, and the like. Preferred foils for surface-roughening are an electrolytic copper foil, a rolled copper foil, a copper alloy foil, and the like. The thickness of the base of the negative electrode current collector is not particularly limited, but preferably 5 μm to 100 μm, and more preferably 8 to 35 μm. When the thickness of the base of the negative electrode current collector is less than 5 μm, the mechanical strength of the negative electrode current collector may become insufficient, which will reduce the ease of handling thereof in the production of the electrode. In addition, the rupture of the electrode will easily occur during charging of the battery. On the other hand, when the thickness of the base of the negative electrode current collector exceeds 100 μm, although the mechanical strength is ensured, the ratio of the volume the negative electrode current collector to that of the electrode is increased, and consequently the capacity of the battery may not be improved sufficiently.

The negative electrode active material layer is formed on one or both surfaces of the negative electrode current collector in its thickness direction and contains a positive electrode active material and, as needed, a conductive agent, a binder, a thickener, and the like. Examples of the negative electrode active material include graphite materials, such as various natural graphites and artificial graphites; silicon-based composite materials, such as silicide; alloy-based negative electrode active materials; and the like. Examples of the conductive agent are the same as those added to the positive electrode active material layer. Examples of the binder are also the same as those added to the positive electrode active material layer. In view of improving the lithium ion acceptability, examples of the binder further include styrene-butadiene copolymer rubber (SBR) particles and modified SBR, and the like.

As the thickener, a commonly used one in this field may be used. In particular, a thickener with water-solubility and being viscous in the form of an aqueous solution is preferred, examples of which include cellulose-based resins, such as carboxymethylcellulose (CMC), and modified materials thereof; polyethylene oxide (PEO); and polyvinyl alcohol (PVA). Among these, cellulose-based resins and modified materials thereof are particularly preferred in view of the dispersability and the thickening property of a negative electrode material mixture slurry as described later.

The negative electrode 51 can be produced in the same manner as the positive electrode 50 except that the negative electrode material mixture slurry is prepared by mixing and dispersing a negative electrode active material, and, as needed, a conductive agent, a binder, a thickener, and the like into a dispersion medium.

As the separator 52, a commonly used one in the field of non-aqueous electrolyte secondary batteries may be used. For example, a microporous film made of polyolefin such as polyethylene and polypropylene is used alone or in combination, which is typical and preferred as an embodiment. More specifically, a porous film made of a synthetic resin may be used as the separator 52. Examples of the synthetic resin include polyolefin, such as polyethylene and polypropylene; aramid resin; polyamide-imide; polyphenylene sulfide; and polyimide. Examples of the porous film include microporous films, non-woven fabrics, and the like. In addition, the separator 52 may include a heat-resistant filler, such as alumina, magnesia, silica, or titania, in its interior or on its surface. Alternatively, a heat-resistant layer may be provided on one or both surfaces of the separator 52 in its thickness direction.

The heat-resistant layer includes, for example, the above-described heat-resistant filler and a binder. As the binder, the same binder as used in the positive electrode active material layer may be used. The thickness of a separator 17 is not particularly limited, but preferably 10 µm to 30 µm, and more preferably 10 to 25 µm.

As the non-aqueous electrolyte, a liquid electrolyte in which a solute is dissolved in an organic solvent; a polymer or solid electrolyte including a solute and an organic solvent immobilized with a polymer compound; and the like may be used. In the case of using a liquid electrolyte, it is preferable to impregnate the separator 17 with the liquid electrolyte. The non-aqueous electrolyte may include an additive in addition to the solute, the organic solvent, and the polymer compound.

The solute is selected based on the redox potential of the active material, and the like. Specifically, as the solute, a commonly used solute in the field of lithium batteries may be used, examples of which include $LiPF_6$, $LiBF_4$, $LiClO_4$, $LiAlCl_4$, $LiSbF_6$, LiSCN, $LiCF_3SO_3$, $LiN(CF_3CO_2)$, $LiN(CF_3SO_2)_2$, $LiAsF_6$, $LiB_{10}Cl_{10}$, lithium lower aliphatic carboxylate, LiF, LiCl, LiBr, LiI, chloroborane lithium, borates such as lithium bis(1,2-benzenedioleate(2-)-O,O') borate, lithium bis(2,3-naphtalenedioleate(2-)-O,O') borate, lithium bis(2,2'-biphenyldioleate(2-)-O,O') borate, and lithium bis(5-fluoro-2-oleate-1-benzenesulfonate-O,O') borate, $(CF_3SO_2)_2$NLi, $LiN(CF_3SO_2)(C_4F_9SO_2)$, $(C_2F_5SO_2)_2$NLi, lithium tetraphenylborate, and the like. These solutes may be used alone or, as needed, in combination of two or more.

As the organic solvent, a commonly used organic solvent in the field of lithium batteries may be used, examples of which include ethylene carbonate (EC), propylene carbonate, butylene carbonate, vinylene carbonate, dimethyl carbonate (DMC), diethyl carbonate, ethyl methyl carbonate (EMC), dipropyl carbonate, methyl formate, methyl acetate, methyl propionate, ethyl propionate, dimethoxymethane, γ-butyrolactone, γ-valerolactone, 1,2-diethoxyethane, 1,2-dimethoxyethane, ethoxymethoxyethane, trimethoxymethane, tetrahydrofuran, tetrahydrofuran derivatives such as 2-methyltetrahydrofuran, dimethylsulfoxide, 1,3-dioxolane, dioxolane derivatives such as 4-methyl-1,3-dioxolane, formamide, acetamide, dimethylformamide, acetonitrile, propylnitrile, nitromethane, ethyl monoglyme, phosphoric acid triester, acetic acid ester, propionic acid ester, sulfolane, 3-methylsulfolane, 1,3-dimethyl-2-imidazolidinone, 3-methyl-2-oxazolidinone, propylene carbonate derivatives, ethyl ether, diethyl ether, 1,3-propanesultone, anisole, fluorobenzene, and the like. These organic solvents may be used alone or, as needed, in combination of two or more.

As the additive, for example, an additive such as vinylene carbonate, cyclohexylbenzene, biphenyl, diphenyl ether, vinylethylene carbonate, divinylethylene carbonate, phenylethylene carbonate, diallyl carbonate, fluoroethylene carbonate, catechol carbonate, vinyl acetate, ethylene sulfite, propane sultone, trifluoropropylene carbonate, dibenzofuran, 2,4-difluoroanisole, o-terphenyl, and m-terphenyl may be included. These additives may be used alone or, as needed, in combination of two or more.

As for the non-aqueous electrolyte, a solid electrolyte prepared by adding the above-described solute into a mixture of one or two or more polymer materials, such as polyethylene oxide, polypropylene oxide, polyphosphazene, polyaziridine, polyethylene sulfide, polyvinyl alcohol, polyvinylidene fluoride, and polyhexafluoropropylene, may be used. Further, a gelled electrolyte prepared by mixing with the above-described organic solvent may be used. Furthermore, an inorganic material, such as a lithium nitride, a lithium halide, a lithium oxyacid salt, $Li_4SiO_4$, $Li_4SiO_4$—LiI—LiOH, $Li_3PO_4$—$Li_4SiO_4$, $Li_2SiS_3$, $Li_3PO_4$—$Li_2S$—$SiS_2$, and a phosphorus sulfide compound, may be used as a solid electrolyte. In the case of using a solid electrolyte or a gelled electrolyte, such an electrolyte may be disposed between the positive electrode 50 and the negative electrode 51 in place of the separator 17. Alternatively, the gelled electrolyte may be disposed adjacently to the separator 52.

As for the positive electrode lead 42, the negative electrode lead 43, the insulating plate 44, the sealing plate 45, the gasket 46, and the battery case 47, a commonly used one in the field of non-aqueous electrolyte secondary batteries may be used for each component.

The non-aqueous electrolyte secondary battery 40 of the present invention is produced, for example, in the following manner. One end of the positive electrode lead 42 and one end of the negative electrode lead 43 are electrically connected to the positive electrode current collector of the positive electrode 50 and the negative electrode current collector of the negative electrode 51, respectively. The electrode plate group 41 is housed in the bottomed-cylindrical battery case 47 together with the sealing plate 44. The other end of the negative electrode lead 43 extended from the lower portion of the electrode plate group 41 is connected to the bottom of the battery case 47, and the other end of the positive electrode lead 42 extended from the upper portion of the electrode plate group 41 is connected to the sealing plate 45. Subsequently, a predetermined amount of the non-aqueous electrolyte (not shown) is injected into the battery case 47. Thereafter, the sealing plate 45 with the gasket 46 disposed on its periphery is inserted into the opening of the battery case 47, and the opening of the battery case 47 is curled inward and crimped to seal the opening, whereby the non-aqueous electrolyte secondary battery 40 is obtained.

Figure 12:
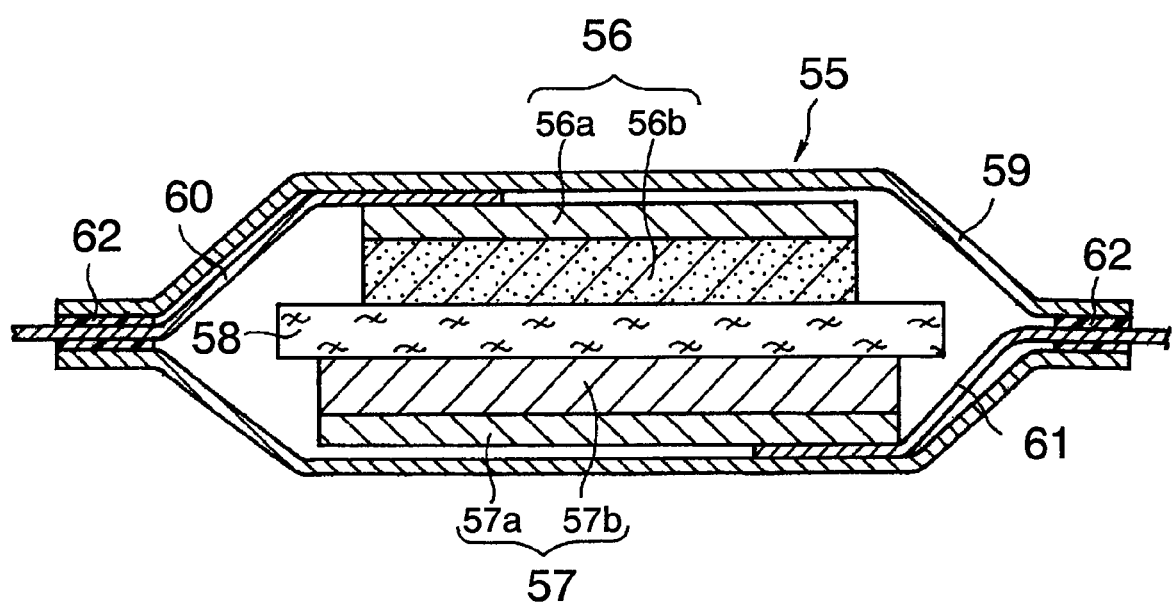
FIG. 12 is a cross-sectional view schematically showing a configuration of a laminated battery as one embodiment of the present invention.

FIG. 12 is a cross-sectional view schematically showing a configuration of a laminated battery 55 as one embodiment of the present invention. The laminated battery 55 includes a positive electrode 56, a negative electrode 57, a separator 58, a battery case 59, a positive electrode lead 60, a negative electrode lead 61, and a sealing resin 62. The positive electrode 56 includes a positive electrode current collector 66a and a positive electrode active material layer 56b formed on one surface of the positive electrode current collector 66a in its thickness direction. The negative electrode 57 includes a negative electrode current collector 57a and a negative electrode active material layer 57b formed on one surface of the negative electrode current collector 57a in its thickness direction. The positive electrode 56 and the negative electrode 57 are disposed so as to be opposite to each other with the separator 58 interposed therebetween. In other words, in the laminated battery 55, the positive electrode 56, the separator 58, and the negative electrode 57 are laminated in this order and formed into a flat electrode plate group. The positive electrode 56, the negative electrode 57, and the separator 58 have the same configuration of the positive electrode 50, the negative electrode 51, and the separator 52 in the non-aqueous electrolyte secondary battery 40, respectively.

The battery case 59 is a container member with two openings and houses the electrode plate group in its internal space. Each of the two openings of the battery case 59 is sealed with the sealing resin 62 interposed therebetween. One end of the positive electrode lead 60 is electrically connected to the positive electrode current collector 66a, and the other end thereof is extended outside of the battery 55 from one opening of the battery case 59. One end of the negative electrode lead 61 is electrically connected to the negative electrode current collector 57a, and the other end thereof is extended outside of the battery 55 from the other opening of the battery case 59. The same non-aqueous electrolyte as used in the non-aqueous electrolyte secondary battery 40 can be used in the laminated battery 55.

As described above, the non-aqueous electrolyte secondary battery of the present invention can adopt various forms, examples of which include a prismatic battery having a spirally-wound electrode plate group, a cylindrical battery having a spirally-wound electrode plate group, a laminated battery having a laminated electrode plate group, and the like.

EXAMPLES

The present invention is described specifically below with reference to examples.

Example 1

(1) Production of Current Collector

Figure 13:
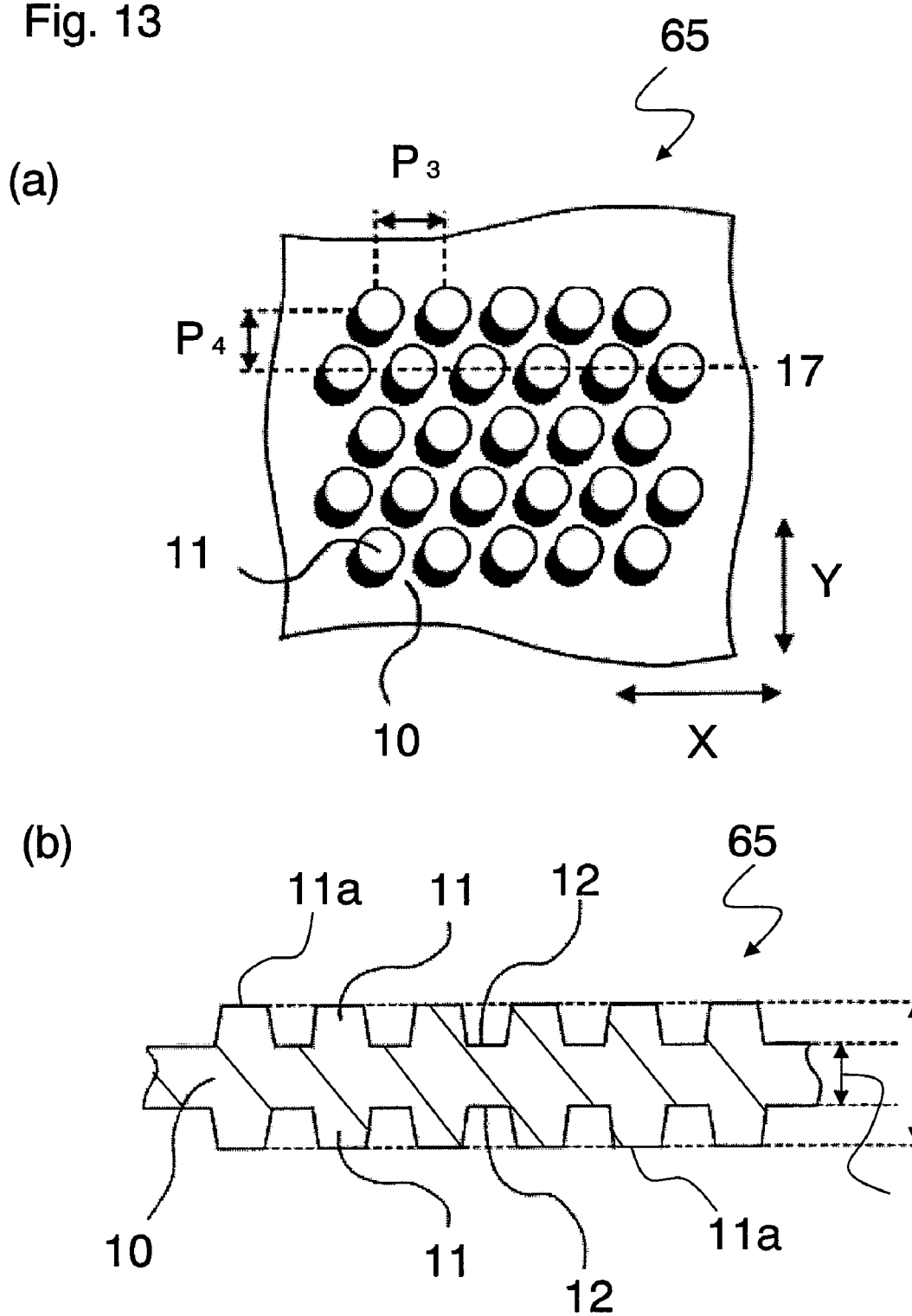
FIG. 13 is a set of drawings schematically showing a configuration of a current collector as one embodiment of the present invention.

A ceramic roller with a plurality of recesses formed thereon was mounted as the roller 15 on the current collector production apparatus 20 shown in FIG. 5, the recesses having a depth of 8 μm and being approximately circular in shape with a tapered cross section (bottom diameter: 8 μm, opening diameter: 12 μm). A 15-μm-thick aluminum foil serving as the raw material sheet 23 for current collector was passed through the press nip 21a in the current collector production apparatus 20 under pressure and was subjected to compression and non-compression, whereby a current collector 65 shown in FIG. 13 was produced. FIG. 13 is a set of drawings schematically showing a configuration of the current collector 65 as one embodiment of the present invention. FIG. 13(a) is a top view of the current collector 65. FIG. 13(b) is a longitudinal cross-sectional view of the current collector 65, namely, a thickness-wise cross-sectional view.

The obtained current collector 65 was a band of current collector including the base 10 made of aluminum and the approximately circular 5-μm-high projections 11 regularly formed on both surfaces of the base 10 in its thickness direction, the current collector having a total height $t_2$ of 20 μm. In the widthwise direction (latitudinal direction) X, the projections 11 were aligned in a row so as to be spaced apart from one another at a pitch $P_3$ to form the row unit 17. In the longitudinal direction Y, the row units 17 were arranged in parallel to one another at a pitch $P_4$. Here, one row unit 17 and another row unit 17 adjacent thereto were arranged such that the rows of the projections 11 were staggered with respect to each other in the widthwise direction X by a distance of $0.5P_3$. Since such an arrangement pattern of the projections 11 was of a closest-packed arrangement, the current collector 65 had a sufficient durability against the tensile stress applied thereto in the longitudinal direction Y. Because of this, in processing the current collector 65 into a positive electrode, processing the obtained positive electrode into a size fit for the battery, and the like, the occurrence of local deformation and deflection on the current collector 65 was prevented.

The surface of the obtained current collector 65 being an aluminum foil was measured with a surface roughness meter. As a result, the surface roughness of the flat surfaces 11a at the tip ends of the projections 11 in the extending direction thereof was approximately equal to that of the aluminum foil before processing. The observation of the projections 11 under a scanning electron microscope (SEM) revealed that there were fine scratches similar to those as observed on the surface of the aluminum foil before processing. On the other hand, the surface roughness of the depressed surface 12 was smaller than that before processing of the projections 11 and was approximately equal to that of the ceramic roller.

The current collector 65 was further subjected to crystal orientation analysis by electron back scattering pattern (EBSP) method. As a result, the crystal grains in the projections 11 and the depressed surface 12 were finer than those before processing. Furthermore, the positive electrode current collector 65 was measured for tensile strength. The results found that the tensile strength was not reduced despite the reduction in thickness at the depressed surface 12. This was presumably because the hardness was increased by compression, resulting in an improvement in the tensile strength.

Based on the foregoing analysis results, it is considered that in the foregoing processing on an aluminum foil, the non-contact surfaces facing the recesses of the ceramic roller were maintained in a non-compressed state, and the contact surfaces other than the non-contact surfaces were subjected to compression, making it possible to provide the current collector 65 as shown in FIG. 13(b) including: the base 10 having been compressed; and the projections 11 formed thereon with end flat surfaces 11a having been non-compressed.

(2) Production of Positive Electrode

A positive electrode material mixture slurry was prepared by stirring and kneading, in an double arm kneader, 100 parts by weight of lithium cobalt oxide serving as a positive electrode active material in which cobalt was partially replaced with nickel and manganese, 2 parts by weight of acetylene black serving as a conductive agent, 2 parts by weight of polyvinylidene fluoride serving as a binder, and an appropriate amount of N-methyl-2-pyrrolidone.

The positive electrode material mixture slurry was applied onto both surfaces of the current collector 65 obtained in the above, dried, and pressed, thereby to yield a positive electrode of the present invention having a total thickness of 126 μm and including a positive electrode active material layer formed on each side thereof having a thickness of 58 μm. The positive electrode thus obtained was slit into a predetermined width to yield a positive electrode plate.

As shown in FIG. 13(a), a band of the current collector 65 had approximately circular projections 11 formed in a closest-packed arrangement and had a sufficient durability against tensile stress applied thereto in the longitudinal direction Y. Because of this, in forming a positive electrode active material layer, slitting, and other steps, the occurrence of local deformation and deflection was prevented and the separation of the positive electrode active material layer was suppressed. As a result, a positive electrode plate being free from deformation and deflection and including a uniformly-formed positive electrode active material layer was obtained.

Example 2

(1) Production of Current Collector

Figure 14:
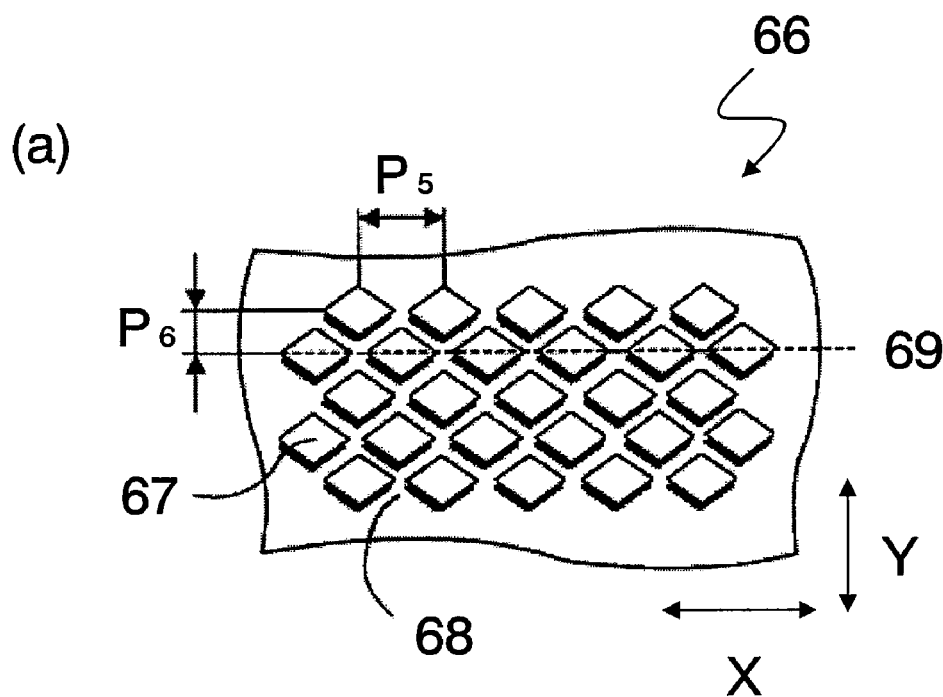
FIG. 14 is a set of drawings schematically showing a configuration of a current collector as one embodiment of the present invention.
Figure 14:
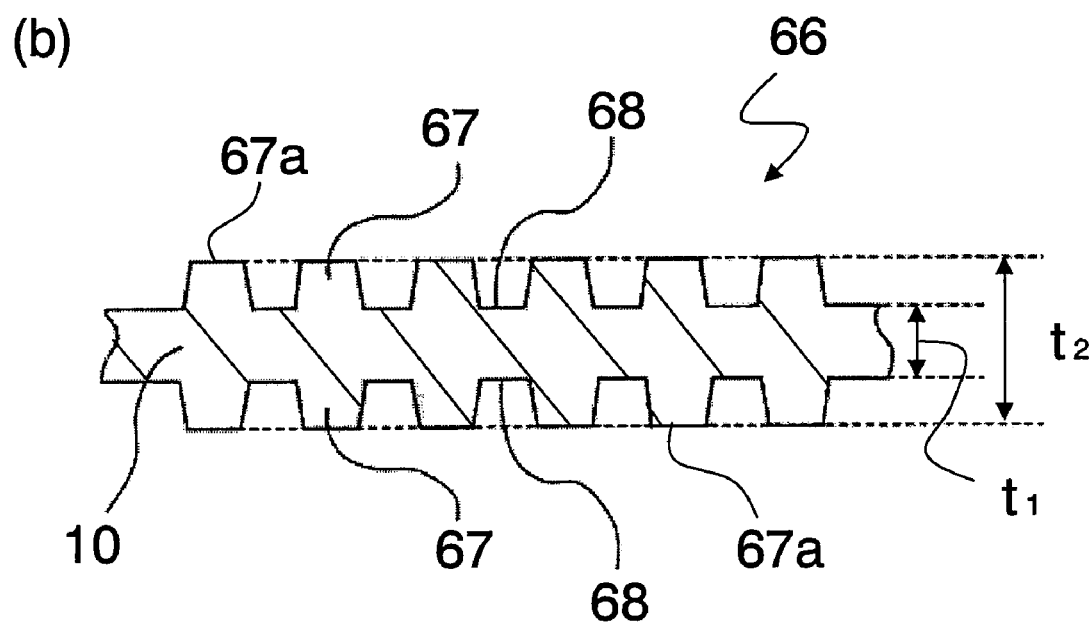

A ceramic roller with a plurality of recesses formed thereon was mounted as the roller 15 on the current collector production apparatus 20 shown in FIG. 5, the recesses having a depth of 10 μm and being approximately rhombic in shape with a tapered cross section (bottom diameter: 15 μm, opening diameter: 20 μm). A 12-μm-thick copper foil serving as the raw material sheet 23 for current collector was passed through the press nip 21a in the current collector production apparatus 21 under pressure and was subjected to compression and non-compression, whereby a current collector 66 shown in FIG. 14 was produced. FIG. 14 is a set of drawings schematically showing a configuration of the current collector 66 as one embodiment of the present invention. FIG. 14(*a*) is a top view of the current collector 66. FIG. 14(*b*) is a longitudinal cross-sectional view of the current collector 66, namely, a thickness-wise cross-sectional view.

The obtained current collector 66 was a band of current collector including the base 10 made of copper and approximately rhombic 6-μm-high projections 67 regularly formed on both surfaces of the base 10 in its thickness direction, the current collector having a total height $t_2$ of 18 μm. In the widthwise direction (latitudinal direction) X, the projections 67 were aligned in a row so as to be spaced apart from one another at a pitch $P_5$ to form a row unit 69. In the longitudinal direction Y, the row units 69 were arranged in parallel to one another at a pitch $P_6$. Here, one row unit 69 and another row unit 69 adjacent thereto were arranged such that the rows of the projections 67 were staggered with respect to each other in the widthwise direction X by a distance of $0.5P_5$. Since such an arrangement pattern of the projections 67 was of a closest-packed arrangement, the current collector 66 had a sufficient durability against the tensile stress applied thereto in the longitudinal direction Y. Because of this, in processing the current collector 66 into a positive electrode, processing the obtained positive electrode into a size fit for the battery, and the like, the occurrence of local deformation and deflection on the current collector 66 was prevented.

The surface of the obtained current collector 66 being a copper foil was measured with a surface roughness meter. As a result, the surface roughness of the flat surfaces 67*a* at the tip ends of the projections 67 in the extending direction thereof was approximately equal to that of the copper foil before processing. The observation of the projections 67 under a scanning electron microscope (SEM) revealed that there were fine scratches similar to those as observed on the surface of the copper foil before processing. On the other hand, the surface roughness of a depressed surface 68 was smaller than that before processing of the projections 67 and was approximately equal to that of the ceramic roller.

The current collector 66 was further subjected to crystal orientation analysis by electron back scattering pattern (EBSP) method. As a result, the crystal grains in the projections 67 and the depressed surface 68 were finer than those before processing. Furthermore, the current collector 66 was measured for tensile strength. The results found that the tensile strength was not reduced despite the reduction in thickness at the depressed surface 68. This was presumably because the hardness was increased by compression, resulting in an improvement in the tensile strength.

Based on the foregoing analysis results, it is considered that in the foregoing processing on a copper foil, the non-contact surfaces facing the recesses of the ceramic roller were maintained in a non-compressed state, and the contact surfaces other than the non-contact surfaces were subjected to compression, making it possible to provide the current collector 66 as shown in FIG. 14(*b*) including: the base 10 having been compressed; and the projections 67 formed thereon with end flat surfaces 67*a* having been non-compressed.

(2) Production of Negative Electrode

A band of negative electrode of the present invention was produced using a vacuum vapor deposition apparatus provided with an electron beam heating means, by performing vapor deposition on both surfaces of the current collector 66 with the 6-μm-high projections 67 formed thereon with the use of silicon having a purity of 99.9999% as a target while oxygen having a purity of 99.7% was introduced, to allow columnar particles whose composition was $SiO_{0.5}$ to grow on the projections 67, and thus to form a 20-μm-thick negative electrode active material layer. This negative electrode was slit into a predetermined width, to yield a negative electrode plate.

As shown in FIG. 14(*a*), since a band of the current collector 66 had approximately rhombic projections 67 formed in a closest-packed arrangement, in vapor-depositing an alloy-based negative electrode active material along the longitudinal direction Y of the current collector 66, the active material was efficiently deposited on the projections 67. Moreover, the current collector 66 had a sufficient durability against tensile stress applied thereto in the longitudinal direction Y. Because of this, in forming columnar particles serving as a negative electrode active material layer, slitting, and other steps, the occurrence of local deformation and deflection was prevented and the separation of the negative electrode active material layer was suppressed. As a result, a negative electrode plate being free from deformation and deflection and including a uniformly-formed negative electrode active material layer was obtained.

Example 3

The non-aqueous electrolyte secondary battery 40 as shown in FIG. 11 was fabricated in the following manner.

(1) Production of Current Collector

The current collector 65 was produced in the same manner as in Example 1 except that the depth of the recesses formed on the surface of the ceramic roller was changed to 10 μm, and a 18-μm-thick copper foil was used as the raw material sheet 23 for current collector. The obtained current collector 65 was a band of current collector including the base 10 made of copper and approximately circular 8-μm-high projections 11 regularly formed on both surfaces of the base 10 in its thickness direction, the current collector having a total height $t_2$ of 26 μm.

The arrangement pattern of the projections 11 in the current collector 65 was of a closest-packed arrangement. Therefore, the current collector 65 had a sufficient durability against the tensile stress applied thereto in the longitudinal direction Y. Because of this, in processing the current collector 65 into an electrode, processing the obtained electrode into a size fit for the battery, and other steps, the occurrence of local deformation and deflection was prevented.

The surface of the obtained current collector 65 being a copper foil was measured with a surface roughness meter. As a result, the surface roughness of the flat surfaces 11*a* at the tip ends of the projections 11 in the extending direction thereof was approximately equal to that of the copper foil before processing. The observation of the projections 11 under a scanning electron microscope (SEM) revealed that there were fine scratches similar to those as observed on the surface of the copper foil before processing. On the other hand, the surface roughness of the depressed surface 12 was smaller than that before processing of the projections 11 and was approximately equal to that of the ceramic roller.

The current collector 65 was further subjected to crystal orientation analysis by electron back scattering pattern (EBSP) method. As a result, the crystal grains in the projections 11 and the depressed surface 12 were finer than those before processing. Furthermore, the current collector 65 was measured for tensile strength. The results found that the tensile strength was not reduced despite the reduction in thickness at the depressed surface 12. This was presumably because the hardness was increased by compression, resulting in an improvement in the tensile strength.

Based on the foregoing analysis results, it is considered that in the foregoing processing on a copper foil, the non-contact surfaces facing the recesses of the ceramic roller were maintained in a non-compressed state, and the contact surfaces other than the non-contact surfaces were subjected to compression, making it possible to provide the current collector 65 as shown in FIG. 13(b) including: the base 10 having been compressed; and the projections 11 formed thereon with end flat surfaces 11a having been non-compressed.

(2) Production of Negative Electrode

A band of negative electrode of the present invention was produced using a vacuum vapor deposition apparatus provided with an electron beam heating means, by performing vapor deposition on both surfaces of the current collector 65 with the 8-μm-high projections 11 formed thereon with the use of silicon having a purity of 99.9999% as a target while oxygen having a purity of 99.7% was introduced, to allow columnar particles whose composition was $SiO_{0.5}$ to grow on the projections 11, and thus to form a 25-μm-thick negative electrode active material layer. This negative electrode was slit into a predetermined width, to yield the negative electrode plate 51.

As shown in FIG. 13(a), since a band of the current collector 65 had approximately circular projections 11 formed in a closest-packed arrangement, in vapor-depositing an alloy-based negative electrode active material along the longitudinal direction Y of the current collector 65, the active material was efficiently deposited on the projections 11. Moreover, the current collector 65 had a sufficient durability against tensile stress applied thereto in the longitudinal direction Y. Because of this, in forming columnar particles serving as a negative electrode active material layer, slitting, and other steps, the occurrence of local deformation and deflection was prevented and the separation of the negative electrode active material layer was suppressed. As a result, the negative electrode plate 51 being free from deformation and deflection and including a uniformly-formed negative electrode active material layer was obtained.

(3) Production of Positive Electrode

The positive electrode of the present invention having a total thickness of 126 μm and including a positive electrode active material layer formed on each side thereof having a thickness of 58 μm was produced in the same manner as in Example 1. This positive electrode was slit into a predetermined width, whereby the positive electrode plate 50 was produced.

(4) Preparation of Non-aqueous Electrolyte

As the non-aqueous electrolyte, an electrolyte obtained by dissolving $LiPF_6$ at a concentration of 1.0 mol/L in a mixed solvent containing ethylene carbonate (EC) and ethyl methyl carbonate (EMC) in a volume ratio of 1:1 was used.

The obtained positive electrode plate 50, the separator 52 (a microporous film made of polyethylene, thickness 20 μm, available from Asahi Kasei Corporation), the obtained negative electrode plate 51, and the separator 52 were stacked and wound, to form the electrode plate group 41. One end of the positive electrode lead 42 was connected to the exposed current collector in the positive electrode plate 50. One end of the negative electrode lead 43 was connected to the exposed current collector in the negative electrode plate 51. The electrode plate group 41 and the insulating plate 44 were housed inside the bottomed cylindrical battery case 47, the other end of the negative electrode lead 43 was connected to the bottom of the battery case 47, subsequently, the other end of the positive electrode lead 42 was connected to the sealing plate 45, and 4.2 mL of the non-aqueous electrolyte was injected into the battery case 47. Thereafter, the sealing plate 45 with the sealing gasket 46 disposed on its periphery was inserted into the opening of the battery case 47, and the rim of the opening of the battery case 47 was curled inward and crimped to seal the opening, whereby the non-aqueous secondary battery 40 of the present invention was fabricated.

After the spirally-wound electrode plate group 41 was produced in the foregoing non-aqueous secondary battery 40, this electrode plate group 41 was disassembled and observed. As a result, no defects such as tearing of electrode plate and separation of electrode active material mixture layer were observed in both the positive electrode plate 50 and the negative electrode plate 51. Further, this non-aqueous secondary battery 40 was subjected to 300 cycles of charge/discharge, but no cycle deterioration was observed. Furthermore, the non-aqueous secondary battery 40 and the electrode plate group 41 were disassembled after 300 cycles. As a result, no defects such as precipitation of lithium onto the negative electrode plate 51 and separation of active material layer were observed.

Based on the foregoing, it is considered that by forming a thin film of active material layer in a columnar state on the non-compressed top surfaces of the projections, it was possible to achieve an effect of reducing the variation in volume caused by expansion and contraction of the thin film of active material layer when absorbing and desorbing lithium, and thus to maintain more favorable battery characteristics.

As shown in Examples 1 to 3, in the electrode of the present invention, the flat surfaces at the tip ends of the projections of the current collector are in a non-compressed state, and thus have no remaining distortion due to processing and have a good surface accuracy, making possible the formation of a uniform thin film thereon. Moreover, since the surface roughness is not reduced and the initial surface roughness is maintained by virtue of the partial compression, it is considered that the adhesion with the active material layer in the form of a thin film is enhanced.

In view of this, in order to further enhance the adhesion between the flat surfaces of the projections and the active material layer, it is considered very effective to roughen the surface of the raw material sheet for current collector in advance.

Further, as shown in Example 3, it is preferable to form the active material layer in the non-aqueous electrolyte secondary battery of the present invention in a columnar state mainly on the non-compressed flat surfaces in the projections. By doing this, it is possible to reduce the variation in volume caused by expansion and contraction of the active material layer when absorbing and desorbing lithium, which occurs in association with charge/discharge of the non-aqueous secondary battery. As a result, it is possible to provide a highly reliable, high capacity non-aqueous secondary battery in which defects such as tearing of electrode plate and separation of active material layer will not occur.

Example 4

(1) Production of Negative Electrode Current Collector

The roller 15 shown in FIG. 4 and an iron roller with flat surface were mounted on the current collector production apparatus 26 shown in FIG. 8. The roller 15 was composed of a core made of iron and a surface layer made of chromium oxide and provided with the recesses 16 arranged in a regular pattern on the surface thereof. The recesses 16 had a depth of 9.5 μm and had a cross section in which a line representing the side surface of the recess 16 inclined by an angle of about 20° with respect to the direction normal to the surface of the roller 15. In other words, the cross section of the recess 16 had a tapered shape in which the cross-sectional diameter was increased from the bottom 16a toward the opening 16b of the recess 16. The diameter of the recess 16 at the opening 16b was 18 μm.

A 18-μm-thick rolled copper foil (available from NIPPON FOIL MFG. CO., LTD.) serving as the raw material sheet 23 for current collector was passed through the press nip in the current collector production apparatus 26 under a line pressure of 1 ton/cm, and was subjected to compression and non-compression, whereby the current collector of the present invention similar to the current collector 25 shown in FIG. 8 was produced. This current collector had the following features.

Thickness of base: 12 μm
Shape of projection: Approximately truncated cone
Shape of cross section of projection: Tapered shape with the cross-sectional diameter decreasing toward the tip end of the projection
Height L of projection: 7 μm
Diameter $D_{0.3}$ at height of 0.3 L of projection: 9.5 μm
Diameter $D_{0.5}$ at height of 0.5 L of projection: 6.0 μm
Diameter $D_{0.8}$ at height of 0.8 L of projection: 4.0 μm
$D_{0.5}/D_{0.3}$: 0.63
$D_{0.8}/D_{0.5}$: 0.67

(2) Formation of Negative Electrode Active Material Layer

An active material layer was formed on the surface of the current collector obtained in the above by vapor deposition, to yield the negative electrode of the present invention.

Figure 15:
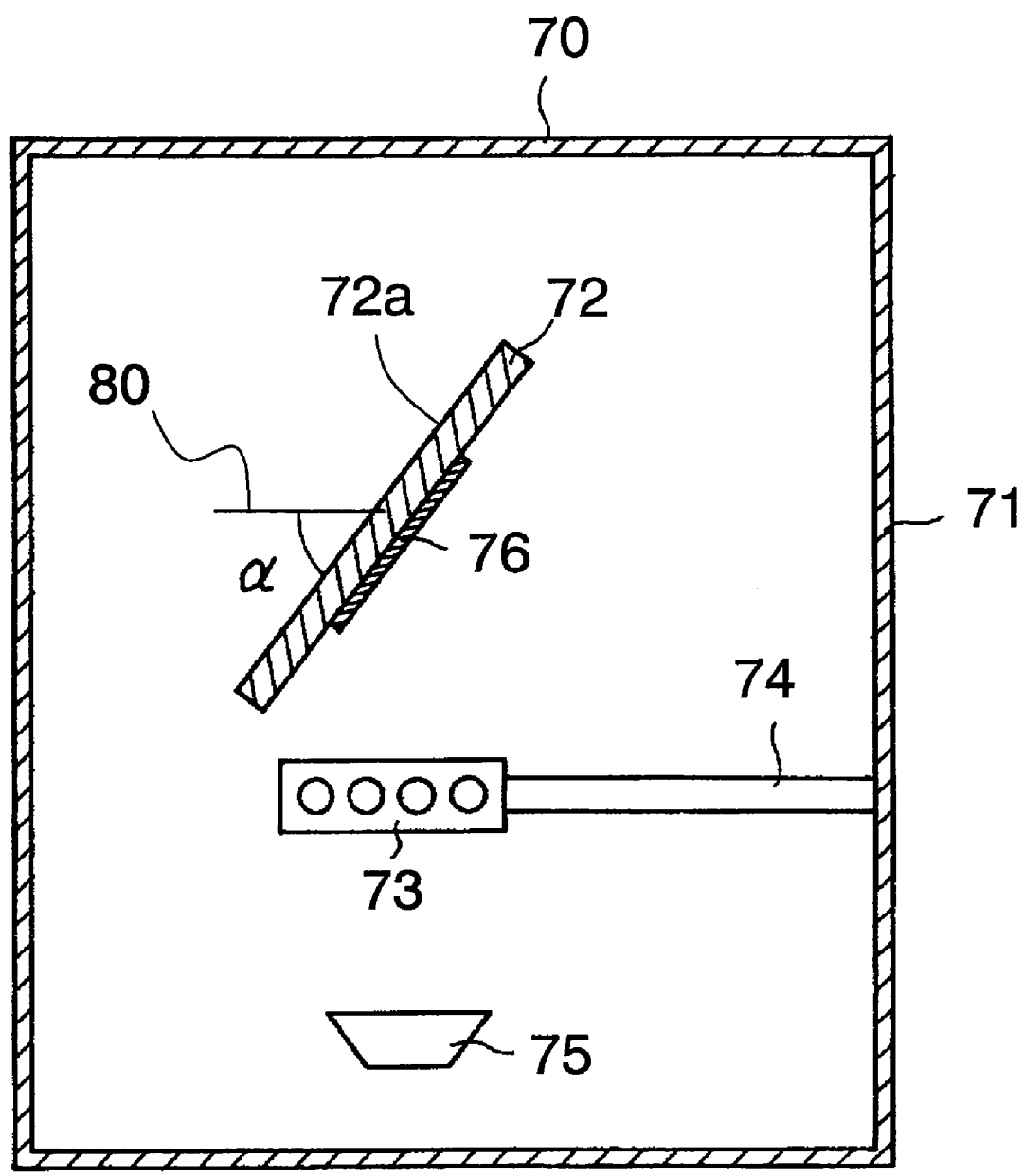
FIG. 15 is a longitudinal cross-sectional view schematically showing a configuration of a vapor-deposition apparatus.

In the vapor deposition, a vapor deposition apparatus 70 (available from ULVAC, Inc.) shown in FIG. 15 was used. FIG. 15 is a longitudinal cross-sectional view schematically showing a configuration of the vapor-deposition apparatus 70. The vapor-deposition apparatus 70 includes a chamber 71, a fixing table 72, a gas emitting nozzle 73, a gas pipe 74, and a target 75. The chamber 71 houses the fixing table 72, the nozzle 73, the gas pipe 74, and the target 75 in the interior space thereof. To the chamber 71, a rotary pump (not shown) and a diffusion pump (not shown) are connected, which enables the adjustment of the degree of vacuum in the interior space. The fixing table 72 is pivotally supported by a supporting means (not shown) and includes a fixing means for fixing the current collector 76 on one surface in its thickness direction. By rotating the fixing table 72, the angle a formed between a surface 72a of the fixing table 72 and a horizontal plane 80 is adjusted, and thus the growth direction of an active material layer on the surface of the current collector 76 is adjusted.

The nozzle 73 is provided vertically below the fixing table 72, and emits a raw material gas of active material. Examples of the raw material gas include oxygen, nitrogen, and the like. Here, in the case of forming an active material layer composed of Si or Sn alone, the nozzle is controlled so as not to emit the raw material gas. The gas pipe 74 is connected to a raw material gas bomb (not shown) provided outside of the vapor deposition apparatus 70, and supplies the raw material gas to the nozzle 73. The target 75 is provided so as to face the fixing table 72 with the nozzle 73 vertically interposed therebetween. Further, the target 75 includes a table (not shown) for placing an active material or a raw material thereof (e.g., Si, Sn, etc.), and an electron beam heating means for heating and vaporizing the active material or the raw material thereof. The target permits a vapor of active material to be emitted vertically upward. The emitted active material vapor was mixed with the raw material gas, as needed, and then reaches and adheres to the surface of the current collector 76. The active material layer is thus formed.

In the vapor deposition apparatus 70 shown in FIG. 15, the fixing table 72 was inclined such that the angle a formed between the surface 72a and the horizontal plane 80 was 70°. The current collector 76 was the current collector obtained in the above cut into a size of 40 mm×40 mm. The current collector 76 was fixed on the fixing table 72 such that the surface with projections formed thereof faces vertically downward. As the target 55, silicon simple substance (available from by Kojundo Chemical Lab. Co. Ltd.) having a purity of 99.9999% was used. The air was evacuated until the degree of vacuum in the chamber 71 reached $5 \times 10^{-5}$ Torr. The acceleration voltage of electron beams for irradiating the target 75 of silicon simple substance was set to −8 kV, and the emission was set to 500 mA. From the nozzle 73, oxygen gas (available from Nippon Sanso Corporation) having a purity of 99.7% was emitted at a flow rate of 30 sccm. The degree of vacuum in the chamber 71 at this time was about $2 \times 10^{-4}$ Torr. The vapor deposition was performed for 30 minutes.

The vapor of silicon simple substance emitted from the target 75 was deposited together with the oxygen emitted from the nozzle 73 on the current collector 76 fixed on the fixing table 72. In this manner, a negative electrode active material layer including columnar particles composed of a silicon oxide was formed, and thus the negative electrode of the present invention was obtained. The content of oxygen and the content of silicon in the negative electrode active material in the columnar particles thus formed were quantified by a combustion method and an ICP emission spectrometry. The results showed that in both cases the composition of the negative electrode active material was $SiO_{0.5}$.

Figure 16:
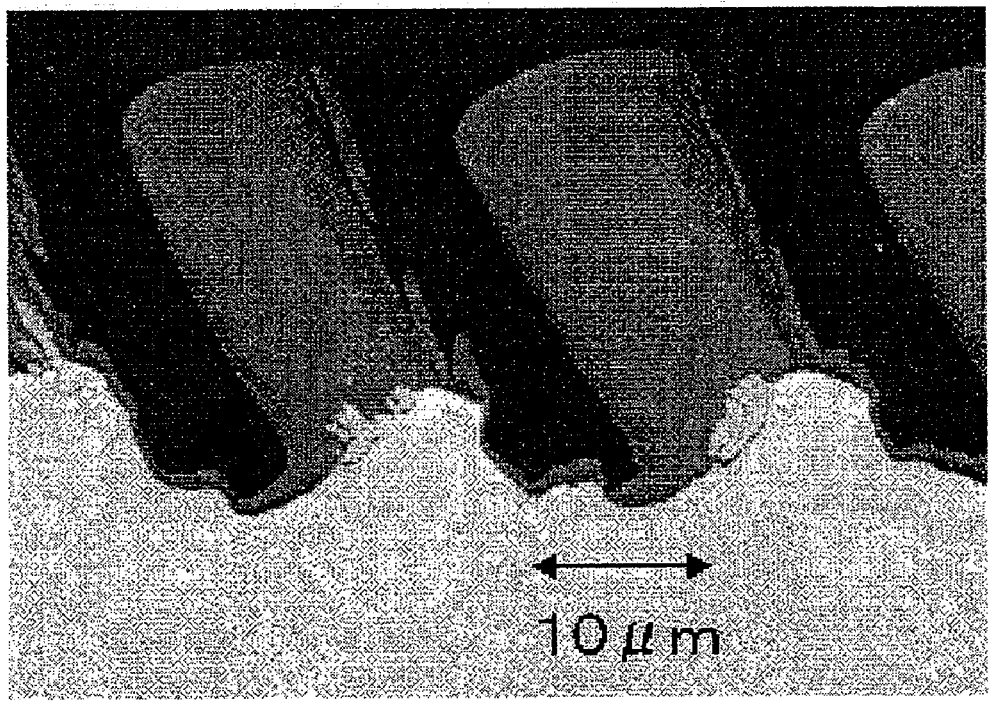
FIG. 16 is a scanning electron micrograph of a cross section of a negative electrode of Example 4.

Next, in order to check the angle $\theta_1$ as shown in FIG. 10 formed between the columnar particles constituting the negative electrode active material layer and the direction normal to the surface of the current collector, a cross section of the negative electrode was observed under a scanning electron microscope. The cross section of the negative electrode was determined such that the cross section was taken parallel to the direction normal to the surface of the current collector and included the highest points of the projections in the current collector, and the area of the cross section of the projections was largest. FIG. 16 is a scanning electron micrograph of a cross section of the negative electrode of Example 4. From FIG. 17, the columnar particles were inclined with respect to the direction normal to the surface of the current collector and were carried on a region spreading from the top surface to the side surface of the projection of the current collector. The angle $\theta_1$ was 27°. This value was obtained by averaging the measured values of any ten columnar particles.

The main physical properties of the negative electrode of Example 4 were as follows.

Composition of active material: $SiO_{0.5}$
$\theta_1$: 27°
Thickness T of active material layer: 24 μm

Example 5

(1) Production of Negative Electrode Current Collector

The current collector of the present invention was produced in the same manner as in Example 4 except that the depth of the recesses 16 was changed from 9.5 μm to 11 μm, the angle formed between a line representing the side surface of the recess 16 with respect to the direction normal to the surface of the roller 15 in the cross section of the recess 16 was changed from about 20° to about 10°, and the diameter of the recess 16 at the opening 16b was changed from 18 μm to about 14 μm. This current collector had the following features.

Thickness of base: 12 μm
Shape of projection: Approximately truncated cone
Shape of cross section of projection: Tapered shape with the cross-sectional diameter decreasing toward the tip end of the projection
Height L of projection: 9 μm
Diameter $D_{0.3}$ at height of 0.3 L of projection: 10 μm
Diameter $D_{0.5}$ at height of 0.5 L of projection: 9.0 μm
Diameter $D_{0.8}$ at height of 0.8 L of projection: 7.3 μm
$D_{0.5}/D_{0.3}$: 0.9
$D_{0.8}/D_{0.5}$: 0.81

(2) Formation of Negative Electrode Active Material Layer

Figure 17:
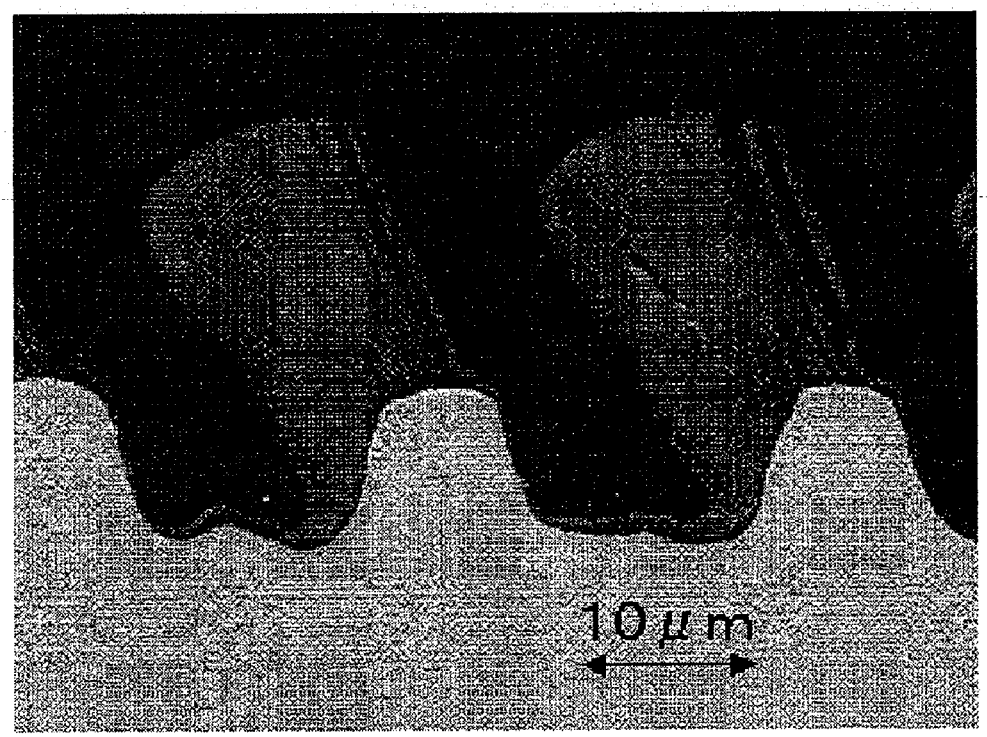
FIG. 17 is a scanning electron micrograph of a cross section of a negative electrode of Example 5.

A negative electrode active material layer was formed in the same manner as in Example 4 except that the current collector obtained in Example 5 was used, and the negative electrode of the present invention was produced. A cross section of the produced negative electrode was observed under a scanning electron microscope. FIG. 17 is a scanning electron micrograph of a cross section of the negative electrode of Example 5. The main features of the negative electrode of Example 5 were as follows.

Composition of active material: $SiO_{0.5}$
$\theta_1$: 25°
Thickness T of active material layer: 25 μm

Example 6

(1) Production of Negative Electrode Current Collector

A negative photoresist was applied onto a 12-μm-thick rolled copper foil (available from NIPPON FOIL MFG. CO., LTD). With the use of a negative mask with a light-shielding dot pattern of 10 μm×10 μm square arranged at an interval of 20 μm, the resist film on the copper foil was exposed to light and developed. Thereafter, in the apertures thus formed in the resist film, copper particles were precipitated by electrolysis, and then the resist was removed. As a result, the current collector of the present invention including projections formed in the shape of an approximate truncated pyramid was obtained. This current collector had the following features.

Thickness of base: 12 μm
Shape of cross section of projection: Tapered shape with the cross-sectional diameter decreasing toward the tip end of the projection
Height L of projection: 8 μm
Diameter $D_{0.3}$ at height of 0.3 L of projection: 10 μm
Diameter $D_{0.5}$ at height of 0.5 L of projection: 9.8 μm
Diameter $D_{0.8}$ at height of 0.8 L of projection: 9.3 μm
$D_{0.5}/D_{0.3}$: 0.98
$D_{0.8}/D_{0.5}$: 0.95

(2) Formation of Negative Electrode Active Material Layer

Figure 18:
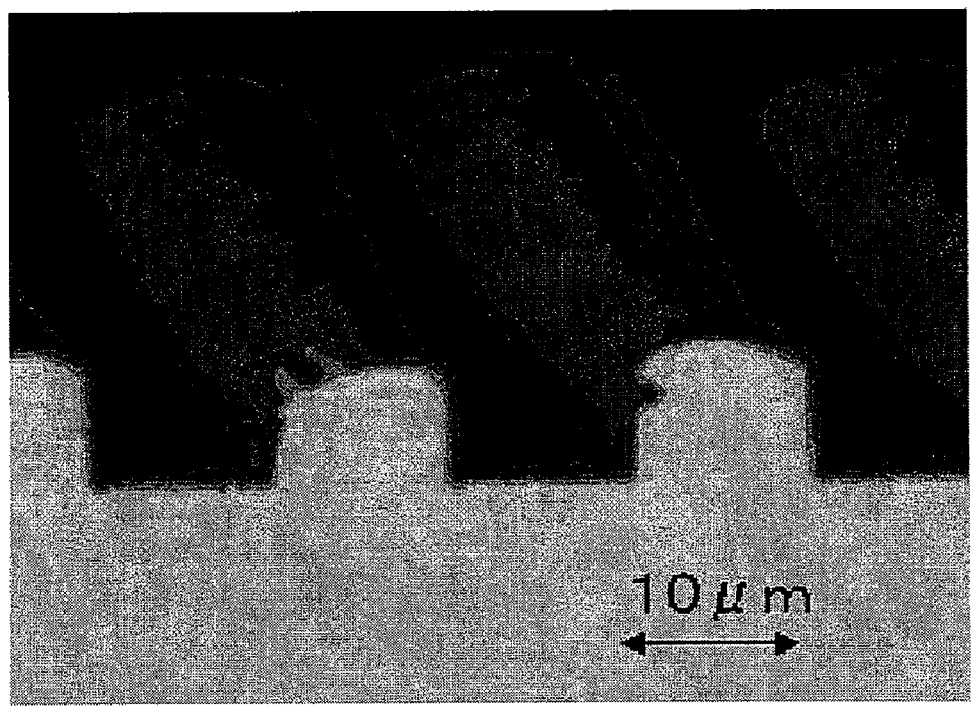
FIG. 18 is a scanning electron micrograph of a cross section of a negative electrode of Example 6.

A negative electrode active material layer was formed in the same manner as in Example 4 except that the current collector obtained in Example 6 was used, and the angle a formed between the fixing table 72 and the horizontal plane 80 was changed to 60°, and the negative electrode of the present invention was produced. A cross section of the produced negative electrode was observed under a scanning electron microscope. FIG. 18 is a scanning electron micrograph of a cross section of the negative electrode of Example 6. The main features of the negative electrode of Example 6 were as follows.

Composition of active material: $SiO_{0.5}$
$\theta_1$: 27°
Thickness T of active material layer: 25 μm

Example 7

(1) Production of Negative Electrode Current Collector

The current collector of the present invention was produced in the same manner as in Example 4 except that the depth of the recesses 16 was changed from 9.5 μm to 10 μm, and the angle formed between a line representing the side surface of the recess 16 with respect to the direction normal to the surface of the roller 15 in the cross section of the recess 16 was changed from about 20° to about 10°. This current collector had the following features.

Thickness of base: 12 μm
Shape of projection: Approximately truncated cone
Shape of cross section of projection: Tapered shape with the cross-sectional diameter decreasing toward the tip end of the projection
Height L of projection: 9 μm
Diameter $D_{0.3}$ at height of 0.3 L of projection: 13 μm
Diameter $D_{0.5}$ at height of 0.5 L of projection: 10 μm
Diameter $D_{0.8}$ at height of 0.8 L of projection: 8.5 μm
$D_{0.5}/D_{0.3}$: 0.77
$D_{0.8}/D_{0.5}$: 0.85

(2) Formation of Negative Electrode Active Material Layer

Figure 19:
FIG. 19 is a scanning electron micrograph of a cross section of a negative electrode of Example 7.

A negative electrode active material layer was formed in the same manner as in Example 4 except that the angle a formed between the surface 72a of the fixing table 72 and the horizontal plane 80 was alternately changed between 60° and 120°, and the negative electrode of the present invention was produced. The columnar particles included in this negative electrode active material layer were composed of six layers of minor columnar bodies stacked in a zigzag shape. A cross section of this negative electrode was observed under a scanning electron microscope. FIG. 19 is a scanning electron micrograph of a cross section of the negative electrode of Example 7. The main features of the negative electrode of Example 7 were as follows.

Composition of active material: $SiO_{0.4}$
Angle θ formed between columnar particle and direction normal to surface of current collector: 0°
Thickness T of active material layer: 24 μm

Comparative Example 1

(1) Production of Negative Electrode Current Collector

A positive photoresist was applied onto a 12-μm-thick rolled copper foil (available from NIPPON FOIL MFG. CO., LTD). With the use of a positive mask with a pattern of 15 μm×15 μm square arranged at an interval of 30 μm, the resist film on the copper foil was exposed to light and developed. Thereafter, in the apertures thus formed in the resist film, copper particles were precipitated by electrolysis, and then the resist was removed. As a result, the current collector including projections formed in the shape of an approximate reverse truncated pyramid was obtained. The physical properties of the current collector are shown below.

Thickness of base: 18 μm
Height L of projection: 7 μm
Diameter $D_{0.3}$ at height of 0.3 L of projection: 11.5 μm
Diameter $D_{0.5}$ at height of 0.5 L of projection: 12.0 μm
Diameter $D_{0.8}$ at height of 0.8 L of projection: 13.5 μm
$D_{0.5}/D_{0.3}$: 1.04
$D_{0.8}/D_{0.5}$: 1.13

(2) Formation of Negative Electrode Active Material Layer

Figure 20:
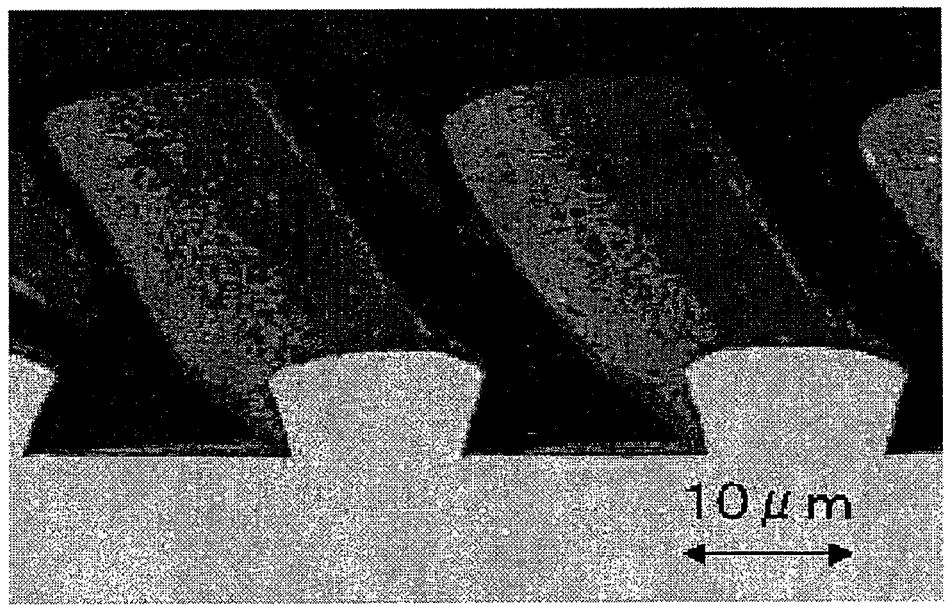
FIG. 20 is a scanning electron micrograph of a cross section of a negative electrode of Comparative Example 1.
Figure 21:
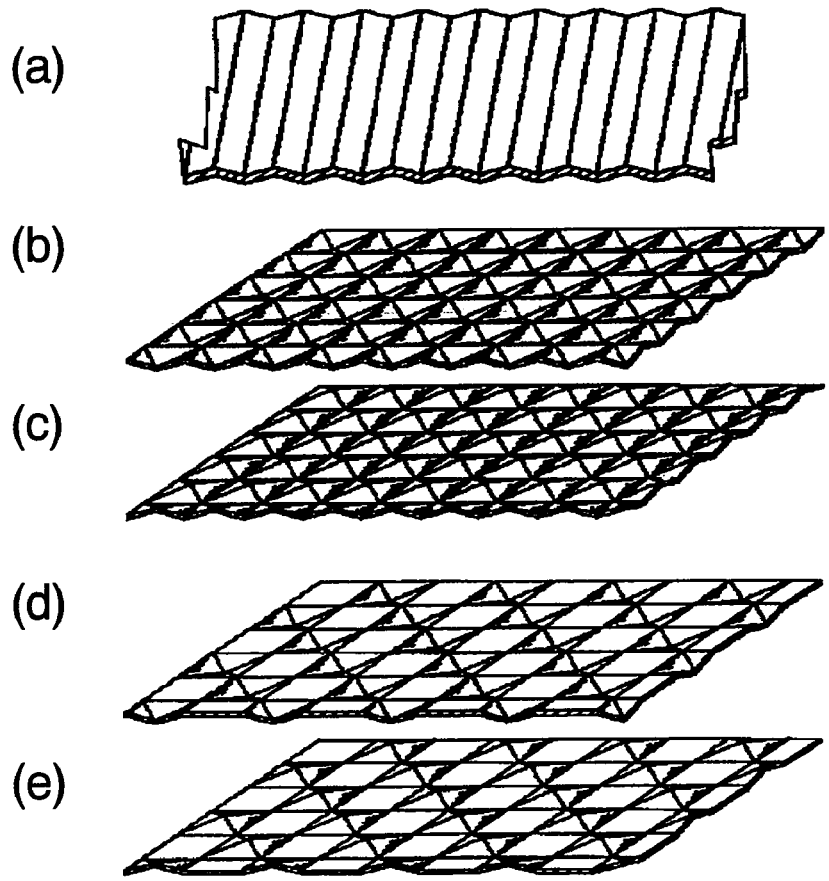
FIG. 21 is a set of perspective views schematically showing a configuration of a conventional current collector.
Figure 22:
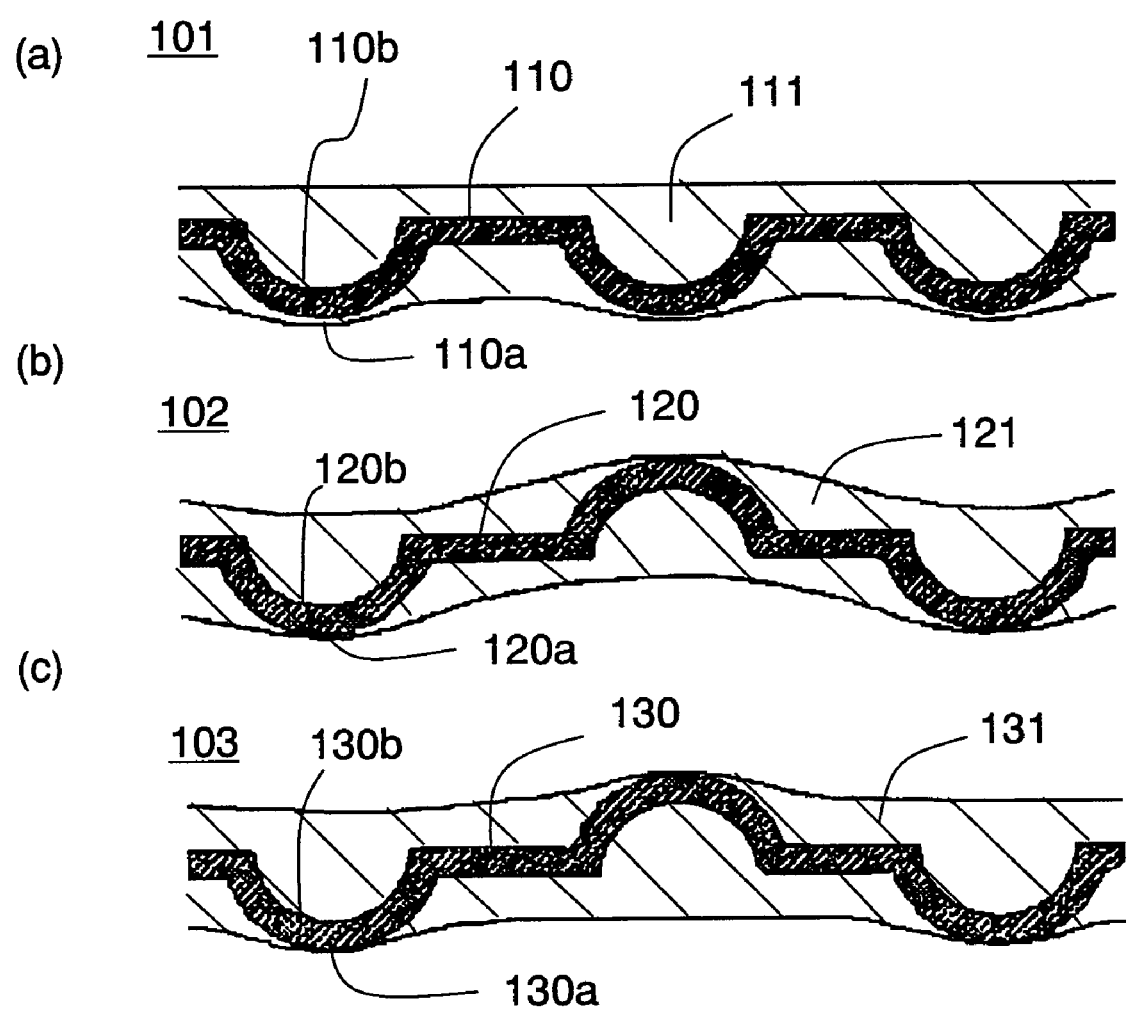
FIG. 22 is a set of longitudinal cross-sectional views schematically showing a conventional electrode.

A negative electrode active material layer was formed in the same manner as in Example 4 except that the current collector obtained in Comparative Example 1 was used, and the angle a formed between the fixing table 72 and the horizontal plane 80 was changed to 600, and a negative electrode was produced. A cross section of the produced negative electrode was observed under a scanning electron microscope. FIG. 20 is a scanning electron micrograph of a cross section of the negative electrode of Comparative Example 1. The main features of the negative electrode of Comparative Example 1 were as follows.

Composition of active material: $SiO_{0.5}$
Angle θ formed between columnar particle and direction normal to surface of current collector: 35°
Thickness T of active material layer: 23 μm With the use of the negative electrodes obtained in Examples 4 to 7 and Comparative Example 1, laminated lithium secondary batteries as shown in FIG. 12 were fabricated in the same manner.

(1) Production of Positive Electrode

A positive electrode material mixture paste was prepared by sufficiently mixing 10 g of lithium cobalt oxide ($LiCoO_2$) powder having a mean particle size of about 10 μm serving as the positive electrode active material, 0.3 g of acetylene black serving as the conductive agent, 0.8 g of polyvinylidene fluoride powder serving as the binder, and an appropriate amount of N-methyl-2-pyrrolidone (NMP).

The resultant positive electrode material mixture paste was applied onto one surface of the positive electrode current collector 56a made of a 20-μm-thick aluminum foil, dried, and then rolled, to form the positive electrode active material layer 56b. Thereafter, the positive electrode 56 having a predetermined size was cut out therefrom. In the positive electrode 56, the positive electrode active material layer 56b formed on one surface of the aluminum foil had a thickness of 70 μm and a size of 30 mm×30 mm. To the back side of the positive electrode current collector 56a, where no positive electrode active material layer 56b formed thereon, the positive electrode lead 60 was connected.

(2) Fabrication of Battery

The positive electrode 56 and the negative electrode 57 (the negative electrodes of Examples 4 to 7 and Comparative Example 1) were opposed to each other with the separator 58 (a microporous film made of polyethylene, thickness 20 μm, available from Asahi Kasei Corporation) interposed therebetween, to form an electrode plate group. To the back side of the negative electrode current collector 57a, where no negative electrode active material layer 57b formed thereon, the negative electrode lead 61 was connected.

Next, the electrode plate group was inserted into the sheathing case 59 made of an aluminum laminate sheet. Subsequently, a non-aqueous electrolyte was injected into the case. As the non-aqueous electrolyte, an electrolyte obtained by dissolving $LiPF_6$ at a concentration of 1.0 mol/L in a mixed solvent containing ethylene carbonate (EC) and ethyl methyl carbonate (EMC) in a volume ratio of 1:1 was used. The non-aqueous electrolyte was impregnated into the positive electrode 56, the negative electrode 57, and the separator 58 by a vacuum impregnation method.

Thereafter, while the positive electrode lead 60 and the negative electrode lead 61 were guided externally, each opening end of the sheathing case 59 was welded with the sealing resin 62 interposed therebetween under vacuum or reduced pressure, whereby batteries of Examples 4 to 7 and Comparative Example 1 were fabricated.

Test Example 1

The batteries of Examples 4 to 7 and Comparative Example 1 were each placed in a constant temperature chamber at a temperature of 20° C. and subjected to a constant-current and constant-voltage system cycle test.

First, the battery was charged at a constant current of 1C rate (1C means a current value at which the capacity of a battery is drained completely in one hour) until the battery voltage reached 4.2 V. After 4.2 V was reached, the battery was charged at a constant voltage until the current value reached 0.05C.

After the termination of the charge, the battery was allowed to stand for 20 minutes, and then discharged at a constant current of 1C rate until the battery voltage reached 2.5 V. Thereafter, the battery was further discharged at a constant current of 0.2C rate until the battery voltage reached 2.5 V. After the termination of the discharge, the battery was allowed to stand for 20 minutes.

The foregoing charge/discharge was repeated to a total of 20 cycles. The ratio of a total discharge capacity at the 20th cycle to a total discharge capacity at the initial stage of the cycle test was calculated as a percentage, which was referred to as a capacity retention rate. The results are shown in Table 1. The battery after the test was disassembled to check for the occurrence of separation of the projections of the current collector.

TABLE 1

| | $D_{0.5}/D_{0.3}$ | Capacity retention rate (%) | Presence of separation | $θ_1$ (°) |
|---|---|---|---|---|
| Example 4 | 0.63 | 96 | No | 27 |
| Example 5 | 0.90 | 97 | No | 25 |
| Example 6 | 0.98 | 90 | No | 27 |
| Example 7 | 0.77 | 97 | No | 0 |
| Comparative Example 1 | 1.04 | 50 | Yes | 35 |

As is evident from Table 1, in the batteries of Examples 4 to 7, the capacity retention rate after 20 cycles was high as compared with that in the battery of Comparative Example 1, resulting in remarkable improvement in the cycle characteristics. Further, as a result of disassembling the battery after 20 cycles and observing the negative electrode, the separation of the active material from the current collector was observed only in Comparative Example 1. Detailed observation on where the separation occurred revealed that the separation occurred at the interface between the base and the projections of the current collector. In contrast, in the negative electrodes of Examples 4 to 7, no separation at the interface between the base and the projections was observed. It is considered that in the negative electrode in the battery of Comparative Example 1, the stress generated at the interface between the projections and the base were not sufficiently dispersed or relieved because of the shape of the projections of a reverse truncated pyramid, and therefore the capacity retention rate was significantly reduced.

INDUSTRIAL APPLICABILITY

The non-aqueous electrolyte secondary battery of the present invention is preferably applicable to, for example, various forms of non-aqueous electrolyte lithium secondary batteries, and particularly preferable to be used as a lithium secondary battery that is required to have a high capacity and favorable cycle characteristics. The shape of the lithium secondary battery to which the present invention is applicable is not particularly limited and may be any shape, such as, coin, button, sheet, cylindrical, flat, and prismatic shapes. The form of the electrode plate group composed of the positive electrode, the negative electrode, and the separator may be of a wound type or a laminated type. The size of the battery may be a small size for use in a small portable device and the like, or a large size for use in an electric vehicle and the like. The lithium secondary battery of the present invention may be used as a power supply for use in, for example, a portable digital assistant, a portable electronic device, an electric power storage devices for household use, a two-wheeled motor vehicle, an electric vehicle, a hybrid electric vehicle, and the like, but there is no particular limitation on the application thereof.

The invention claimed is:

1. An electrode comprising a current collector and an active material layer, wherein:

the current collector comprises a base and a plurality of projections formed so as to extend outwardly from a surface of the base, wherein a cross section of the projections in a thickness direction of the current collector has a tapered shape in which a width in a direction parallel to the surface of the base narrows from the surface of the base along an extending direction of the projections, and tip ends of the projections in the extending direction of the projections have a flat surface; and the active material layer includes columnar particles containing an active material, the columnar particles being formed so as to extend outwardly from surfaces of the projections of the current collector.

2. The electrode in accordance with claim 1, wherein the columnar particles are inclined with respect to a direction normal to a surface of the current collector.

3. The electrode in accordance with claim 1, wherein each of the columnar particles is a stack of a plurality of columnar bodies containing the active material.

4. The electrode in accordance with claim 1, wherein the active material is at least one alloy-based negative electrode active material selected from the group consisting of silicon, tin, germanium, and aluminum, and/or a compound containing the at least one alloy-based negative electrode active material.

5. The electrode in accordance with claim 4, wherein the compound containing the at least one alloy-based negative electrode active material is at least one selected from the group consisting of an alloy, an oxide, and a sulfide containing the at least one alloy-based negative electrode active material.

6. A non-aqueous electrolyte secondary battery comprising the electrode in accordance with claim 1, a counter electrode thereof, and a non-aqueous electrolyte with lithium ion conductivity.

* * * * *